United States Patent
Ichihashi

(10) Patent No.: US 8,031,309 B2
(45) Date of Patent: Oct. 4, 2011

(54) LIQUID CRYSTAL DISPLAY DEVICE HAVING RETARDATION FILM ON INSIDE OF SUBSTRATE COMPENSATING FOR LIGHT OF A PARTICULAR WAVELENGTH

(75) Inventor: Mitsuyoshi Ichihashi, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 517 days.

(21) Appl. No.: 12/095,921

(22) PCT Filed: Dec. 14, 2006

(86) PCT No.: PCT/JP2006/325443
§ 371 (c)(1),
(2), (4) Date: Jun. 3, 2008

(87) PCT Pub. No.: WO2007/069781
PCT Pub. Date: Jun. 21, 2007

(65) Prior Publication Data
US 2009/0168001 A1    Jul. 2, 2009

(30) Foreign Application Priority Data
Dec. 14, 2005 (JP) ................... 2005-360824

(51) Int. Cl.
*G02F 1/1335* (2006.01)
(52) U.S. Cl. .................. 349/119; 349/106; 349/117
(58) Field of Classification Search .......... 349/106, 349/117–121
See application file for complete search history.

(56) References Cited

U.S. PATENT DOCUMENTS

| | | | |
|---|---|---|---|
| 5,448,386 A | 9/1995 | Watanabe et al. | |
| 5,499,126 A * | 3/1996 | Abileah et al. | 349/106 |
| 5,818,615 A | 10/1998 | Abileah et al. | |
| 6,169,590 B1 | 1/2001 | Abileah et al. | |
| 6,226,063 B1 | 5/2001 | Hsieh et al. | |
| 2003/0210370 A1* | 11/2003 | Yano et al. | 349/117 |
| 2005/0142464 A1* | 6/2005 | Moriya | 430/7 |
| 2006/0176427 A1 | 8/2006 | Yoshimi et al. | |

FOREIGN PATENT DOCUMENTS

| | | |
|---|---|---|
| EP | 0 656 560 | 6/1995 |
| JP | 2-020825 A | 1/1990 |
| JP | 02-125224 | 5/1990 |
| JP | 3-191327 A | 8/1991 |

(Continued)

OTHER PUBLICATIONS

Supplementary European Search Report issued in the corresponding Application No. 06835055.2-1228 dated Feb. 9, 2010.

(Continued)

*Primary Examiner* — Michael Caley
(74) *Attorney, Agent, or Firm* — Buchanan Ingersoll Rooney PC

(57) ABSTRACT

A liquid crystal display device comprising a pair of substrates, at least one polarizing film provided outside the pair of substrates, a liquid crystal cell having a red color filter, a green color filter and a blue color filter provided inside the pair of substrates, a first retardation film compensating for light of a wavelength or wavelengths corresponding to a color or colors of any one or two of the three color filters, and a second retardation film compensating for light of a wavelength that is not compensated for by the first retardation film.

6 Claims, 3 Drawing Sheets

FOREIGN PATENT DOCUMENTS

| | | |
|---|---|---|
| JP | 4-134322 A | 5/1992 |
| JP | 7-168190 A | 7/1995 |
| JP | 07-199173 A | 8/1995 |
| JP | 8-240798 A | 7/1996 |
| JP | 8-334619 A | 12/1996 |
| JP | 9-054212 A | 2/1997 |
| JP | 9-080424 A | 3/1997 |
| JP | 9-292522 A | 11/1997 |
| JP | 10-020301 A | 1/1998 |
| JP | 10-054982 A | 2/1998 |
| JP | 10-307291 A | 11/1998 |
| JP | 11-095208 A | 4/1999 |
| JP | 11-133408 A | 5/1999 |
| JP | 11-202323 A | 7/1999 |
| JP | 11-305217 A | 11/1999 |
| JP | 2001-125105 A | 5/2001 |
| JP | 2002-221622 A | 8/2002 |
| JP | 2003-015134 A | 1/2003 |
| JP | 2003-207634 A | 7/2003 |
| JP | 2003-262872 A | 9/2003 |
| JP | 2004-240102 A | 8/2004 |
| WO | WO 01/33290 A1 | 5/2001 |
| WO | WO 2005/022214 | 3/2005 |

OTHER PUBLICATIONS

Form PCT/ISA/210 (International Search Report) dated Feb. 27, 2007.

Form PCT/ISA/237 (Written Opinion of the International Searching Authority) dated Feb. 27, 2007.

Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2006/325567, Jun. 26, 2008, The International Bureau of WIPO, Geneva, CH.

Office Action from Japanese Patent Office dated Mar. 15, 2011, issued in corresponding Japanese Patent Application No. 2005-360824, with an English translation thereof.

Office Action (Decision of Refusal) issued by the Japanese Patent Office issued in corresponding Japanese Patent Application No. 2005-360824 dated Jun. 7, 2011, with an English translation thereof.

* cited by examiner

LIQUID CRYSTAL DISPLAY DEVICE HAVING RETARDATION FILM ON INSIDE OF SUBSTRATE COMPENSATING FOR LIGHT OF A PARTICULAR WAVELENGTH

TECHNICAL FIELD

The present invention relates to a liquid crystal display device, and, in particular, to a liquid crystal display device in which a contrast viewing angle is widened and the viewing angle dependency of hue at the time of black level is improved.

BACKGROUND ART

Widely used is a liquid crystal display device with a system in which a liquid crystal layer of twist-arranged nematic liquid crystal is interposed between two orthogonal polarizing plates and an electric field is applied in the perpendicular direction to the substrate, so-called TN mode. In the system, since the liquid crystal rises relative to the substrate at the time of black level, when viewed from an oblique direction, birefringence due to the liquid crystal molecule generates and light leakage occurs. To solve the problem, a system, in which a film in which liquid crystalline molecules are hybrid-aligned is used to optically compensate for a liquid crystal cell and prevent the light leakage, has been put into practical use. However, even when liquid crystalline molecules are used, it is very difficult to optically compensate for a liquid crystal cell completely without problem, thereby resulting in such problem that graduation reversal in the bottom of a screen can not completely suppressed.

In order to solve such problem, there have been proposed and put into practical use a liquid crystal display device according to so-called in-plane switching (IPS) mode and fringe field (FFS) in which a lateral electric field is applied to the liquid crystal, and vertical alignment (VA) mode in which a liquid crystal having negative permittivity anisotropy is vertically aligned and alignment-divided by a protrusion or slit electrode formed in a panel. Recently, these panels are being developed not only for monitor application but also for TV application, and, concurrently, luminance of the screen has been significantly improved. Therefore, slight light leakage in a diagonally oblique incident direction at the time of black level, which was conventionally not seen as a problem in these operation modes, has come to the surface as a cause of the lowering of display quality.

As one of means for improving hue or viewing angle at black level, arrangement of an optical compensatory material having birefringence property between a liquid crystal layer and a polarizing plate is also examined in IPS mode. For example, there is disclosed that, by arranging birefringence media having function of compensating increase and decrease in retardation of a liquid crystal layer in an inclined state while setting optical axes to be perpendicular with each other between a substrate and a polarizing plate, coloring when white level or gray level is looked from an oblique direction can be improved (see JP-A-9-80424).

Further, there are proposed a method in which an optical compensatory film composed of a styrene-based polymer having negative intrinsic birefringence or a discotic liquid crystalline compound is used (see JP-A-10-54982, JP-A-11-202323 and JP-A-9-292522), a method in which a film having positive birefringence and an optical axis within the plane thereof and a film having positive birefringence and an optical axis in the normal direction thereof are combined as an optical compensatory film (see JP-A-11-133408), a method in which a biaxial optical compensatory sheet having retardation of half wavelength is used (see JP-A-11-305217), and a method in which, while using a film having negative retardation as a protective film of a polarizing plate, an optical compensatory layer having positive retardation is provided on the surface thereof (see JP-A-10-307291).

On the other hand, in VA mode also, it is also know that a wider viewing angle property can be obtained by using two negative uniaxial retardation films having an optical axis in the direction perpendicular to the film surface above and below a liquid crystal cell, and that a more wider viewing angle property can be realized by additionally using a uniaxially-aligning retardation film having positive refractive index anisotropy with an in-plane retardation value of 100 nm for the LCD (see SID 97 DIGEST pp 845-848). There are disclosed such methods that number of retardation films is decreased while maintaining a similar compensating effect (see JP-A-11-95208), and that a cholesteric liquid crystal layer is used as a negative uniaxial retardation film (see JP-A-2003-15134 and JP-A-11-95208). Further, such method is also proposed as preventing light leakage by controlling wavelength dispersion of retardation of a retardation film (see JP-A-2002-221622).

However, since most of the proposed systems are systems in which viewing angle is improved by canceling anisotropy of birefringence of liquid crystal in a liquid crystal cell, there is such problem that light leakage on the basis of departure of the cross angle of polarizing axes from orthogonality when orthogonal polarizing plates are viewed from an oblique direction can not sufficiently solved. Further, it is very difficult to optically compensate for a liquid crystal cell completely without problem even in a system that is said to be capable of compensating this light leakage. In the method of JP-A-2002-221622 also, there is such problem that the wavelength dispersion of in-plane retardation is taken into consideration, but that the wavelength dispersion of retardation in the thickness direction is not taken into consideration and the effect of suppressing light leakage in oblique directions is insufficient. More importantly, there is such problem that complete compensation for light leakage of an incident light in an oblique direction is difficult for a polarizing plate at black level to result in occurrence of azimuthal angle dependency of color drift.

On the other hand, methods are proposed in which optical compensation is effected for originally colored STN (Super Twisted Nematic) mode and ECB (Electrically Controlled Birefringence) mode for respective colors of a red color filter, a green color filter and a blue color filter independently from a front face to reduce coloring of a panel viewed from front direction (see JP-A-02-20825, JP-A-03-191327, JP-A-04-134322, JP-A-07-168190, JP-A-08-240798, JP-A-08-334619, JP-A-09-54212 and JP-A-10-20301). These pattern-form retardation films having different retardation for respective colors on color filters or at positions corresponding to color filters on a substrate facing to color filters. As a method for forming a retardation film arranged inside a cell, a method is published, in which a polymer liquid crystal material or a polymerizable liquid crystal material is applied in an intended optical thickness for respective colors, the liquid crystal is aligned, and then it is fixed to form the film. Further, JP-A-2004-240102 proposes an attempt to reduce coloring of black by combining the system with VA mode.

However, in order to form such retardation films having different Re for respective sub pixels of red, green and blue inside a cell, patterning extending even to three times is required. The increase in process number considerably pushes up cost to make actual practice of the process impossible. In addition, there is such problem that the patterning of a retardation film extending even to three times results in a very high defective product ratio caused by unevenness of the retardation film in the optical axis direction. Further, there is such problem that control of the gap is difficult because thick optical elements having different retardations are inserted inside the cell.

DISCLOSURE OF THE INVENTION

The present invention was completed with the view of above-described problems, and aims to provide a liquid crystal display device having a simple constitution and significantly improved viewing field as well as display quality.

The purpose of the invention is to provide a liquid crystal display device, in particular, a VA mode, FFS mode or IPS mode liquid crystal display device in which a liquid crystal cell is optically compensated for in all the visible light region and whose light leakage in viewing angle at black level and viewing angle dependency of hue are reduced.

Means to solve the problem are as follows.

(1) A liquid crystal display device having a pair of substrates, at least one polarizing film provided outside the pair of substrates, a liquid crystal cell having at least three color filters of a red color filter, a green color filter and a blue color filter provided inside the pair of substrates, a first retardation film, and a second retardation film, wherein:

the first retardation film compensates for light of a wavelength or wavelengths corresponding to a color or colors of any one or two of the three color filters, and the second retardation film is arranged inside the substrate of the pair of substrates and compensates for light of a wavelength that is not compensated for by the first retardation film.

(2) The liquid crystal display device described in (1), wherein in-plain retardation (Re2) of the second retardation film is ½ or less of in-plane retardation (Re1) of the first retardation film.

(3) The liquid crystal display device described in (1) or (2), wherein the first retardation film is provided between the pair of substrates and the polarizing film.

(4) The liquid crystal display device described in any one of items (1) to (3), wherein slow phase axes of the first retardation film and the second retardation film viewed from the normal direction of film surface are parallel or perpendicular to an absorption axis of the polarizing film.

(5) The liquid crystal display device described in any one of items (1) to (4), wherein the second retardation film contains a liquid crystalline compound.

(6) The liquid crystal display device described in any one of items (1) to (5), wherein the in-plane retardation (Re2) of the second retardation film is 0 nm-120 nm.

(7) The liquid crystal display device described in any one of items (1) to (6), wherein a protective film is provided on the surface of the polarizing film nearer to the liquid crystal cell and retardation Rth in the thickness direction of the protective film is −40 nm-40 nm.

(8) The liquid crystal display device described in any one of items (1) to (7), wherein a protective film is provided on the surface of the polarizing film nearer to the liquid crystal cell and the protective film is composed of a cellulose acylate film or a norbornene-based film.

It is possible to improve light leakage at the time of black level when viewed from an oblique azimuthal direction, in particular, from oblique direction of 45°, without any alteration of characteristics in the front face direction. Further, since it is possible to decrease wavelength dependency of light leakage thereof, coloring viewed from an oblique direction at the time of black level, and viewing angle dependency of variation of hue thereof can be significantly improved.

BEST MODE FOR CARRYING OUT THE INVENTION

Figure 1:
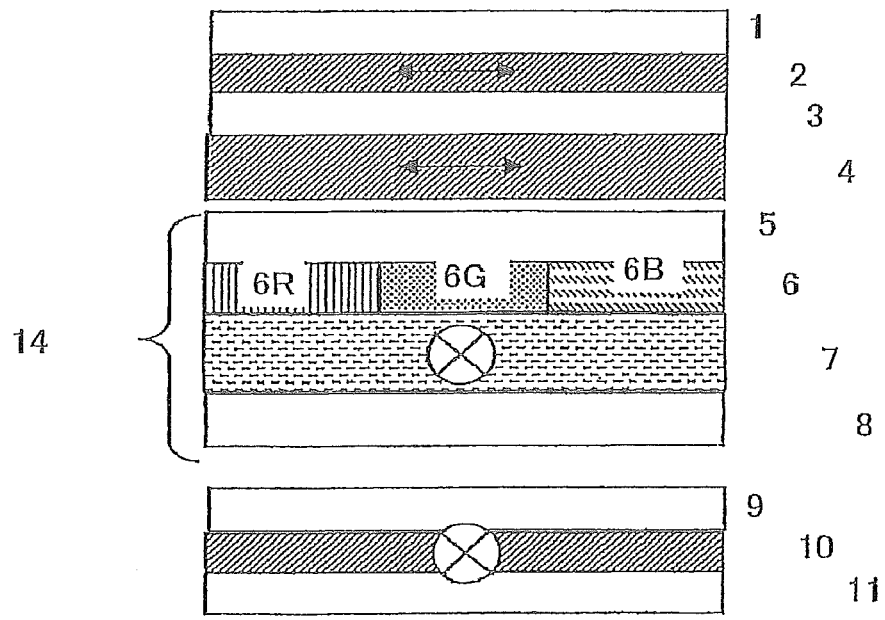
FIG. 1 is a schematic drawing showing constitution of a publicly known general IPS mode liquid crystal display device.

Hereinafter, one embodiment of the liquid crystal display device of the present invention and constitutional members thereof will be described sequentially. In this connection, the range of numerical values represented by using "-" herein means a range that includes numerical values described before and after "-" as the lower limit and the upper limit, respectively.

Re and Rth as used herein represent, respectively, in-plane retardation and retardation in the thickness direction at a wavelength of 550 nm. Re is measured by irradiating light having a wavelength of 550 nm in the normal direction of a film in KOBRA 21ADH (manufactured by Oji Scientific Instruments). Rth is calculated by KOBRA 21ADH on the basis of retardation values measured in total three directions, that is, the aforementioned Re, a retardation value measured by irradiating light having a wavelength of 550 nm from a direction tilted in +40° relative to the film normal direction while taking an in-plane slow phase axis (judged by KOBRA 21ADH) as a tilt axis (rotation axis), and a retardation value measured by irradiating light having a wavelength of 550 nm from a direction tilted in −40° relative to the film normal direction while taking an in-plane slow phase axis as a tilt axis (rotation axis).

Here, as a presumptive value of an average refractive index, values in Polymer Handbook (JOHN WILEY & SONS, INC) and catalogs of various optical films can be used. For a material whose value of an average refractive index is not known, it can be measured with an Abbe refractometer. Values of average refractive index of prevailing optical films are exemplified below: cellulose acylate (1.48), cycloolefin polymer (1.52), polycarbonate (1.59), polymethyl methacrylate (1.49), and polystyrene (1.59). By inputting a presumptive value of the average refractive index and a film thickness, KOBRA 21ADH calculates nx, ny and nz.

The sign of the Rth is determined to be positive when retardation is more than Re, and negative when retardation is less than Re, wherein the retardation is measured by irradiating light having a wavelength of 550 nm from a direction inclining in +20° relative to the normal direction of a film while using a in-plane slow phase axis as a tilt axis (rotation axis). But, for a sample having |Rth/Re| of 9 or more, the sign is determined to be positive when a slow phase axis of the sample is parallel to the film plane, and negative when the slow phase axis is in the thickness direction of the film, wherein the slow phase axis can be determined by using an inspection plate of a polarizing plate in such state as inclined in +40° relative to the normal direction of the film employing an in-plane fast phase axis as a tilt axis (rotation axis) by using a polarizing microscope provided with a freely rotatable pedestal.

Terms "parallel" and "perpendicular" as used herein mean that an angle is within a range of less than the strict angle ±10°. As to the range, an error from the strict angle is preferably less than ±5°, more preferably less than ±2°. The term "substantially vertical" means that an angle is within a range of less than the strict vertical angle ±20°. As to the range, an error from the strict angle is preferably less than ±15°, more preferably ±10°. The term "slow phase axis" means the direction in which the refractive index becomes largest. The value of the refractive index is one measured at λ=550 nm in the visible light region, unless otherwise stated specially.

Unless otherwise stated specially, the term "a polarizing plate" as used herein is used in a meaning that includes both of a long polarizing plate and a polarizing plate cut ("cut" is intended herein to include "punching," "cutout" and the like) into a size for mounting in an liquid crystal device. Terms "a polarizing film" and "a polarizing plate" are distinctively as used herein, wherein the "polarizing plate" is intended to mean a laminated body having a protective film for protecting the polarizing film on at least one face of the "polarizing film."

Hereinafter, the operation and embodiment of the invention will be described in detail using the drawings. FIG. 1 is a schematic drawing showing a constitution of a general IPS mode liquid crystal display device. The IPS mode liquid crystal display device has a pair of glass substrates (5, 8), a liquid crystal cell (14) having a liquid crystal layer (7), in which the liquid crystal is horizontally aligned relative to the substrate face when no voltage is applied, that is, at the time of black level, disposed between the glass substrates, and a polarizing layer 1 (2) and a polarizing layer 2 (10) that hold the liquid crystal cell (14) between them and are arranged so that respective transmission axis directions are orthogonalized with each other. In FIG. 1, light is intended to enter from the polarizing layer 2 side. An arrow in FIG. 1 indicates a direction of a polarization absorption axis or a slow phase axis of a retardation layer, and ⊗ indicates a light-absorbing axis or the slow phase axis of the retardation layer in the direction perpendicular to the arrow. 1, 3, 9 and 11 in FIG. 1 indicate, in this order, a polarizing plate protective film 1, a polarizing plate protective film 2, a polarizing plate protective film 3 and a polarizing plate protective film 4.

In the case where light proceeding in the normal direction of the liquid crystal display device face, that is, in the Z axis direction enters when no voltage is applied, the light passed through the polarizing layer 2 (10) passes through the liquid crystal cell (14) while maintaining a linear polarization state, and is completely shielded by the polarizing layer 1 (2). As the result, it is possible to display an image having a high contrast.

However, the circumstance differs in the case of oblique light incidence. When light enters not from the z axis direction, but from an oblique direction, that is, from an oblique direction relative to the polarizing direction of the polarizing layer 1 (2) and the polarizing layer 2 (10), apparent transmission axes of the polarizing layer 1 (2) and the polarizing layer 2 (10) deviate from orthogonality. Further, usually, a transparent film such as the polarizing plate protective film 2 (3) or the polarizing plate protective film 3 (9) is often provided between the polarizing layer and the liquid crystal cell, and the polarization state varies due to the influence of retardation of the transparent film from the oblique direction. Caused by these two primary factors, an incident light from an oblique direction is not completely shielded by the polarizing layer 1 (2), thereby leading to occurrence of light pass-through at the time of black level and lowering of contrast.

As means for suppressing the light pass-through, a method is known in which a retardation layer 1 (4) having an Re of about 275 nm and an Rth of about 0 nm as shown in FIG. 1 is arranged so that the slow phase axis thereof is parallel or perpendicular to the absorption axis of an adjacent polarizing layer (in FIG. 1, the polarizing layer 1 (2)) (e.g., JP-A-11-305217).

Here, a polar angle and an azimuthal angle are defined. The polar angle is an tilt angle from the normal direction of the film surface, that is, the Z axis, and, for example, in the normal direction of the film surface, the polar angle=0°. The azimuthal angle indicates an azimuth resulting from anticlockwise rotation on the basis of the positive direction of the x axis, and, for example, in the positive direction of the x axis, the azimuthal angle=0°, and in the positive direction of the y axis, the azimuthal angle=90°. The aforementioned oblique direction mainly indicates the case where a polar angle is not 0, and an azimuthal angle=45°, 135°, 225° or 315°.

Figure 4:
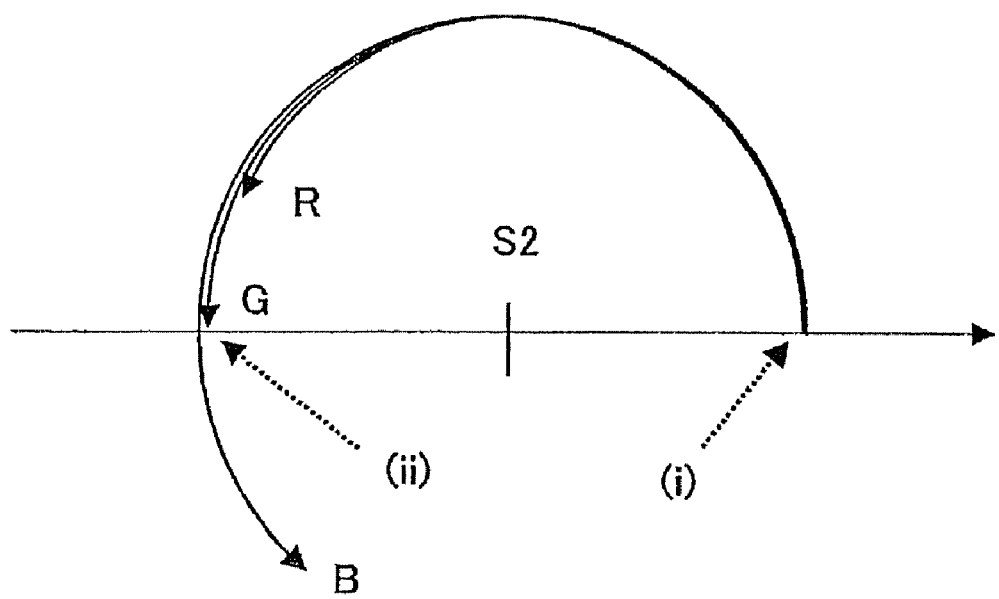
FIG. 4 is a drawing illustrating the constitution of the IPS mode liquid crystal display device in FIG. 1 using the Poincare sphere.

FIG. 4 is a drawing illustrating a compensation mechanism in constitution in FIG. 1 using a Poincare sphere. Here, light has an incident direction of an azimuthal angle=45° and a polar angle=60°. In FIG. 4, an S2 axis is an axis vertically penetrating the paper from above to below. In FIG. 4, the drawing is a Poincare sphere viewed from the positive direction of the S2 axis, and is drawn while enlarging the portion. Since FIG. 4 is shown planarly, displacement of a point before and after variation of a polarization state is shown with a straight arrow line in the drawing. In actual, however, variation of the polarization state caused by passing through a liquid crystal layer or an optical compensation film is, on a Poincare sphere, represented by rotation in a specified angle around a specified axis determined corresponding to respective optical properties. In the drawing, a case where no refractive index anisotropy of the polarizing plate protective film 1 and the polarizing plate protective film 2 is assumed.

The polarization state of an incident light passed through the polarizing plate 2 (10) in FIG. 1 corresponds to a point (i) in FIG. 4, and the polarization state shielded by an absorption axis of the polarizing layer 1 (2) in FIG. 1 corresponds to a point (ii) in FIG. 4. Conventionally, in a liquid crystal display device, an optical compensation film is used, generally, for varying the polarization state of an incident light from the point (i) to the point (ii), including the variation of the polarization state in the liquid crystal layer. When the polarizing plate protective film 3 (9) has no refractive index anisotropy, the polarization state of an incident light does not vary for any wavelengths by passing through the polarizing plate protective film 3 (9) and the liquid crystal layer (7) to remain at the point (i). After that, the polarization state transits by the retardation layer 1 (4) being a first retardation film. On this occasion, at respective wavelengths of a red color filter (hereinafter, occasionally indicated as "R"), a green color filter (hereinafter, occasionally indicated as "G") and a blue color filter (hereinafter, occasionally indicated as "B") having different wavelengths, rotation angles do not coincide with one another. Therefore, the polarization state before passing through the polarizing layer 1 (2) parts for the red color filter (6R), the green color filter (6G) and the blue color filter (6B). As the result, not all the light of respective colors can be absorbed by the polarizing layer 1 (2), therefore light pass-through could not completely suppressed. In addition, since light amounts of respective colors passing through the polarizing layer 1 (2) differ from one another, this parting caused coloring.

Figure 2:
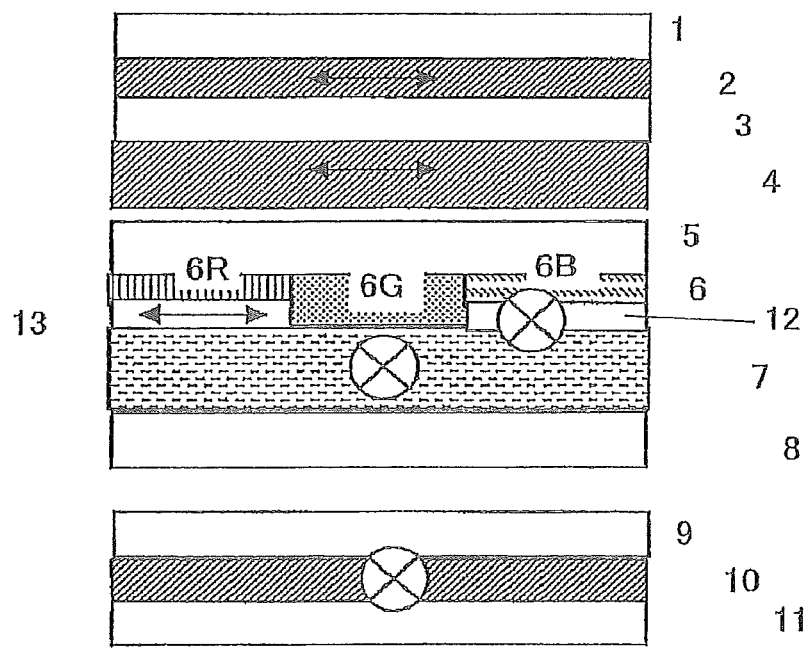
FIG. 2 is a schematic drawing showing one example of constitution of the IPS mode liquid crystal display device of the present invention.

The invention is characterize by compensating individually for a light of wavelength that could not completely be compensated for by conventional constitution. For example, the constitution in FIG. 1 can completely compensate for G (6G), but can not completely compensate for wavelengths of R (6R) and B (6B). Therefore, these R (6R) and B (6B) are individually compensated for in addition. In FIG. 2, a constitutional example for describing the function of the invention is schematically shown. The constitution in FIG. 2 is a constitution in which, to the constitution in FIG. 1, a retardation layer 2 (12) being a second retardation film with Re of 72 nm and Rth of approximately 0 nm is arranged between the liquid crystal layer and B while intercrossing the slow phase axis perpendicularly to the retardation layer 1 (4), and, in addition, a retardation layer 3 (13) being a second retardation film with Re of 65 nm and Rth of approximately 0 nm is arranged between the liquid crystal layer and R (6R) so that the slow phase axis thereof is parallel to the retardation layer 1 (4). With help from the retardation layer 2 and the retardation layer 3, by previously pulling back the polarization state of B that will overrun the point (ii) in FIG. 4, and by previously advancing the polarization state that will not reach (ii) by passing through the retardation layer 1 (4), it is possible to match polarization states of R, G, B to (ii) after passing through the retardation layer 1. As the result, it is possible to improve significantly viewing angle contrast at black level, as well as to reduce significantly coloring in a viewing angle direction at black level. Here, as the wavelength of R, G, B, a wavelength λ=650 nm for R, a wavelength λ=550 nm for G, and a wavelength λ=450 nm for B were used. The wavelength of R, G, B is not always represented by these wavelengths, but they are thought to be appropriate wavelengths to show the effect of the invention.

Figure 5:
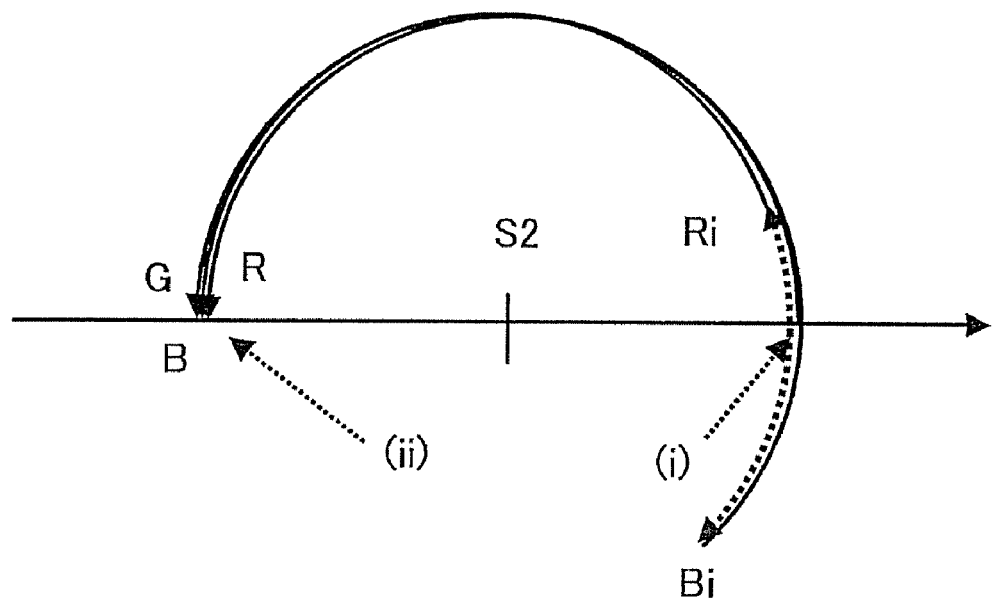
FIG. 5 is a drawing illustrating the constitution of the IPS mode liquid crystal display device in FIG. 2 using the Poincare sphere.

FIG. 5 shows the polarization state of an oblique incident light having an azimuthal angle of 45° and a polar angle of 60° in the constitution of FIG. 2. Numerals in the drawing are common to those in FIG. 1 (same for FIG. 3). The polarization state of a light passed through the polarizing layer 2, the polarizing plate protective film 3, and the liquid crystal layer is indicated by the point (i). By passing through the retardation layer 2 and the retardation layer 3 having the aforementioned optical property, B transits from the point (i) to (iB) in the drawing as shown by the lower arrow, G does not transit and remains at the point (i), and R transits from the point (i) to the point (iR) as shown by the upper arrow. After that, the light passes through the retardation layer 1 to be of the polarization state indicated by the point (R), point (G) and point (B) in the drawing just before the polarizing layer 1. Each of respective polarization states coincides approximately with the point (ii), and, as the result, it becomes possible to prevent the light pass-through approximately completely at any wavelengths of R, G, B. The above is described about the transition of the polarization state when light enters from the polarizing layer 2 side. The same effect can be obtained when the light enters from the polarizing layer 1 side.

Figure 3:
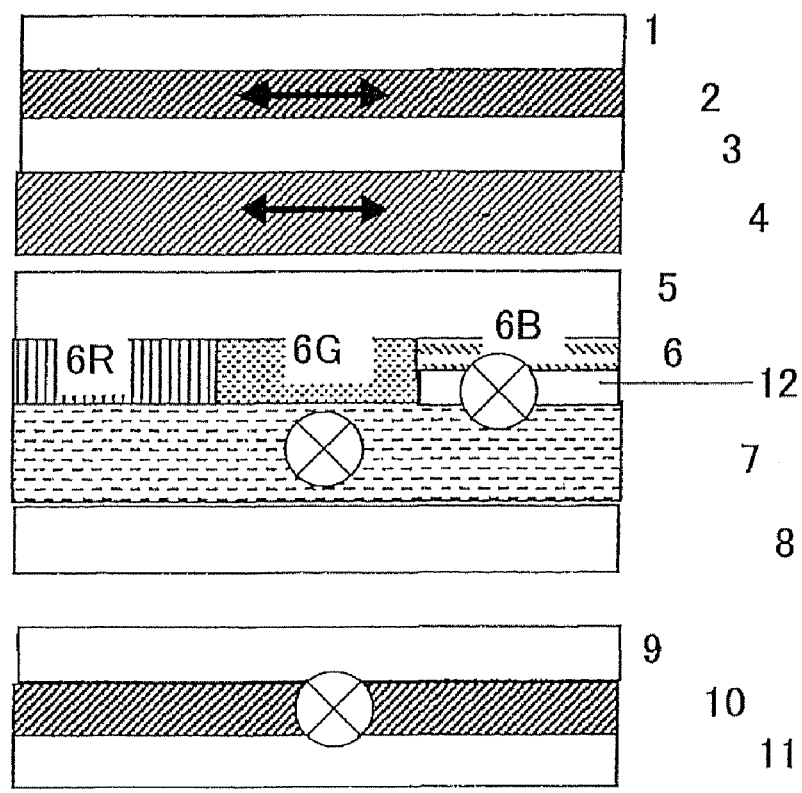
FIG. 3 is a schematic drawing showing another example of the IPS mode liquid crystal display device of the invention.
Figure 6:
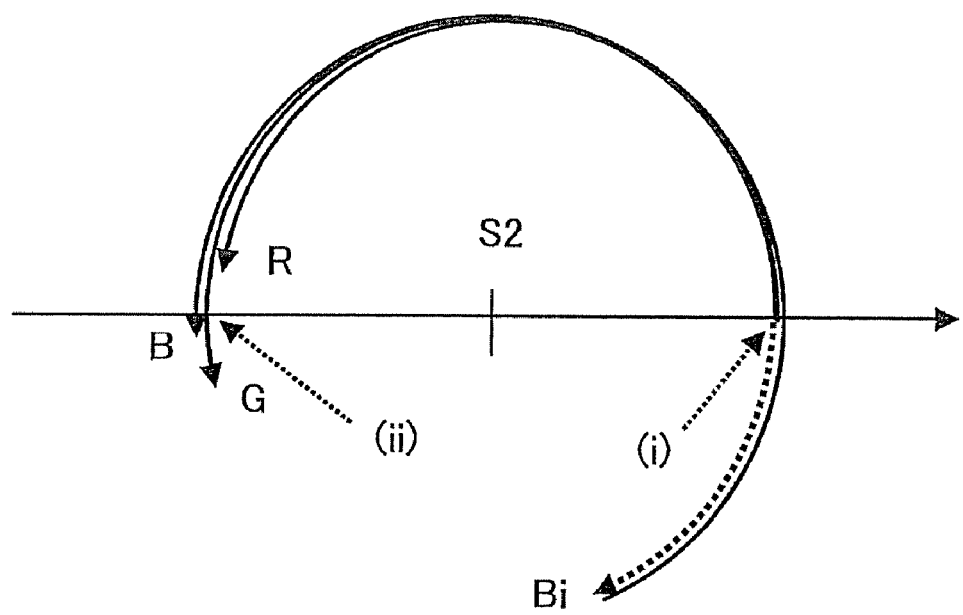
FIG. 6 is a drawing illustrating the constitution of the IPS mode liquid crystal display device in FIG. 3 using the Poincare sphere.

In FIG. 3, another constitutional example for describing the function of the invention is schematically shown. The constitution in FIG. 3 is a constitution in which, in the constitution in FIG. 1, Re of the retardation layer 1 (4) is determined to 300 nm that can allow an approximately medium wavelength of R and G to come most closely to the point (ii), and, further, a retardation layer 2 (12) being the second retardation film having Re of about 105 nm and Rth of approximately 0 nm is arranged between a liquid crystal layer (7) and B so that the slow phase axis thereof is perpendicular to the retardation layer 1 (4). The polarization state of an oblique incident light with an azimuthal angle=45° and a polar angle=60° in this constitution is shown in FIG. 6. The polarization state of light passed through the polarizing layer 2, the polarizing plate protective film 3 and the liquid crystal layer is indicated by the point (i). As the result of passing through the retardation layer 2 having the aforementioned optical property, B transits from the point (i) to the point (iB) in the drawing as shown by an arrow in a clockwise direction, and G and R remain at (i) without transition. After that, the light passes through the retardation layer 1 to become a light of the polarization state shown by the point (R), point (G) and point (B) in the drawing just before the polarizing layer 1. Respective polarization states come close to the point (ii), making it possible to reduce the light pass-through at any wavelengths of R, G, B. As the result, the viewing angle contrast at black level is significantly improved, and, at the same time, coloring in a viewing angle direction at black level is significantly reduced. The above describes about the transition of the polarization state when light enters from the polarizing layer 2 side. The same effect can be obtained when the light enters from the polarizing layer 1 side.

In the invention, incomplete compensation that is attributable to wavelength dispersion of a commonly used first retardation film is corrected by a second retardation film only for a light whose compensation has been not complete, thus approximately complete compensation is effected in any wavelengths of R, G, B. In this system, it becomes possible to use even a retardation film which has a poor wavelength dispersion property and is not used generally, although inexpensive, as a first retardation film. In addition, since the second retardation film is a film for correcting shift based on the wavelength dispersion, it sufficiently functions with a very small retardation compared with the first retardation film. Therefore, compared with a conventional system of forming different retardation films for respective R, G, B, a significantly thin film thickness can be realized. Consequently, there is such characteristic that planarization is easily effected even when a retardation film is provided, according to such method as controlling the thickness of the color filter. In addition, needless to say, the system has such large advantage that process number for forming additional compensation films can be decreased to ⅓ or ⅔ of a conventional system.

Here, the first retardation film functions so as to reduce light leakage caused by anisotropy of birefringence of liquid crystal in a liquid crystal cell occurring in the direction of a polar angle of 60° and an azimuthal angle of 45° at the time of black level of a liquid crystal display device, or shift of a polarizing axes crossing angle from orthogonality when orthogonal polarizing plates are viewed from an oblique direction. When the compensation is not performed, usually, although somewhat varying depending on operation mode of liquid crystal, light leakage becomes large at this azimuthal angle in any operation mode, and 0.5%-3.5% of linearly-polarized light entering a liquid crystal display device leaks in the aforementioned light-observing direction to induce a large contrast lowering. The compensation by the first retardation film indicates reducing this light leakage, and, in the invention, an effect of reducing light leakage to one seventh or less, the light leakage being measured in the direction of a polar angle of 60° and an azimuthal angle of 45° with a single wavelength at the time of black level when a first retardation film is not used. On the other hand, "is not compensated for" indicates a state in which the light leakage falls within a range of more than one seventh to the same amount as the case where no first retardation film is used.

According to the idea of the invention, as combinations of a wavelength for which the first retardation film (retardation layer 1) can completely compensate (a wavelength to be compensated for among any of B, G, R, medium of B and G, medium of G and R) and a retardation film adjacent to respective color filters, it is possible to apply plural systems as shown in Table 1. One of these systems is selected in accordance with operation mode and compensation system of a liquid crystal, required properties of additional retardation films, and cost and performance target. As to the position of the first retardation film, although the inside and outside of a liquid crystal cell can give the same effect of optical performance, it is preferred to form the same between a cell and a polarizing plate from the viewpoint of rework property and wideness of the selection range of material. On the other hand, as to the position of a second retardation film (retardation layer 2), it is preferred to form the same between the liquid crystal layer and the color filter, between the color filter and the substrate, or between driving electrodes and the substrate from the viewpoint of preventing lowering of compensation capability caused by parallax. When parallel light is used as a backlight, the formation between the liquid crystal cell and the polarizing plate is possible.

TABLE 1

| Wavelength for which a first retardation film can completely compensate | Necessary second retardation film | | |
| --- | --- | --- | --- |
| | Two types of additional retardation layers at two positions in one pixel | Two types of additional retardation layers at one position in one pixel | One type of additional retardation layer at one position in one pixel |
| B | Different retardation films for respective G and R | Identical retardation film for G and R | |
| G | Different retardation films for respective R and B | | |
| R | Different retardation films for respective G and B | Identical retardation film for B and G | |
| Medium of B & R | | | Retardation film for R alone |
| Medium of G & R | | | Retardation film for G alone |

In FIGS. 2 and 3, an embodiment of a transmission mode display device provided with an upper polarizing plate and a lower polarizing plate is illustrated, but the invention may be also applied to an embodiment of reflection mode provided with only one polarizing plate. In the latter case, since light path in a liquid crystal cell is doubled, the optimum $\Delta n \cdot d$ value is around ½ of the above value. Further, since the invention bases on compensation for wavelength dispersion of the first retardation film (retardation layer 1), a liquid crystal cell for use in the invention is not limited to that of IPS mode, but any liquid crystal display device using a polarizing plate can be used preferably. Examples of these include a FFS mode liquid crystal display device, a VA mode liquid crystal display device, an OCB mode liquid crystal display device, a TN mode liquid crystal display device, a ferroelectric liquid crystal display device, an antiferroelectric liquid crystal display device, and an ECB mode liquid crystal display device.

The constitution of the liquid crystal display device of the invention is not limited to those illustrated in FIGS. 2 and 3, and may include another member. For example, an overcoat layer may be arranged between the liquid crystal layer and the retardation layer 2. Surfaces of polarizing plate protective film 1-4 may be subjected to an antireflection processing or provided with a hard coat layer. Constitutional members to which conductivity is given may be used. When the device is used as a transmission type, a backlight having a light source of a cold cathode or hot cathode fluorescent tube, a light-emitting diode, a field emission element, or an electroluminescent element may be arranged on the backside. In this case, the backlight may be arranged either on the upper side or the lower side in FIGS. 2 and 3. Between the liquid crystal layer and the backlight, a reflection type polarizing plate or diffusion plate, a prism sheet, or a light guide plate may be also arranged. As described above, the liquid crystal display device of the invention is of a reflection type. In this case, only one polarizing plate is arranged satisfactorily on the observation side, and a reflection film is arranged on the backside of a liquid crystal cell or inside a lower substrate of the liquid crystal cell. Of course, it is also possible to provide a front light using the above-described light source on the observation side of the liquid crystal cell.

The liquid crystal display device of the invention includes devices of an image direct view type, image projection type and light modulation type. In particular, the invention exerts effectiveness when it is applied to an embodiment of an active matrix liquid crystal display device using a three-terminal or two-terminal semiconductor element such as TFT or MIM. Of course, an embodiment in which the invention is applied to a passive matrix liquid crystal display device referred to as time division driving is also effective.

Hereinafter, preferable optical properties of various members usable for the liquid crystal display device of the invention, materials used for the member, production methods of these, and the like will be describe in detail.

[First Retardation Film]

As the first retardation film, a film, which is mainly used for suppressing light leakage of a liquid crystal display device in oblique direction at the black level, can be used in the same way in accordance with operation mode of the liquid crystal display device. For example, for a liquid crystal display device of IPS mode or VA mode, constitutions shown in Table 2 are put into practical use or proposed. In FIG. 2, only constitutional components necessary for viewing angle compensation are listed for simplification. In the case where two retardation films are used in lamination, the constitution with a reversed lamination order also exerts an effect of suppressing light leakage in an oblique direction. In this case, they are laminated in a state in which respective slow phase axis directions of retardation films are rotate in 90°, but, since constitutions are basically identical optically, the case is not listed in this Table to avoid overlap. Light may enter either from the direction of upper side or lower side of the Table. Films, which have optical properties of retardation films 1-1-1-3 in the Table that are used for the purpose of preventing light leakage caused by birefringence of liquid crystal, or combination thereof can be employed as the first retardation film of the invention. As the wavelength that is satisfactorily compensated for by the first retardation film at a polar angle of 60° and an azimuthal angle of 45°, any wavelength of R, G, B can be selected by varying Re or Rth of the first retardation film in the range described in Table 2.

In Table 2, IPS mode and VA mode are listed. But a retardation film in which a discotic liquid crystalline compound used for TN mode or OCB mode is aligned and fixed, and a biaxial retardation film can be also used as the first retardation film of the invention.

TABLE 2

| | 1 | 2 | 3 | 4 |
|---|---|---|---|---|
| Polarizing plate protective film | Re = 0-10 nm<br>Rth = −20-60 nm | Re = 0-10 nm<br>Rth = −20-60 nm | Re = 0-10 nm<br>Rth = −20-60 nm | Re = 0-10 nm<br>Rth = −20-60 nm |
| Polarizing film | 0° | 0° | 0° | 0° |
| Polarizing plate protective film | None or<br>Re = 0-10 nm<br>Rth = −20-60 nm | None or<br>Re = 0-10 nm<br>Rth = −20-60 nm | None or<br>Re = 0-10 nm<br>Rth = −20-60 nm | None or<br>Re = 0-10 nm<br>Rth = −20-60 nm |
| Retardation film 1-1 | None,<br>Re = 120-300 nm,<br>Rth = 0 nm<br>azimuth = 0° or 90° | Re = 0-10 nm<br>Rth = 30-110 nm<br>azimuth = 0° or 90° | Re = 0-10 nm<br>Rth = −70-150 nm<br>azimuth = 0° or 90° | Re = 70-150 nm<br>Rth = −100--30 nm<br>azimuth = 0° |
| Retardation film 1-2 | None | Re = 100-160 nm<br>Rth = −100--30 nm<br>azimuth = 90° | Re = 100-160 nm<br>Rth = 50-100 nm<br>azimuth = 0° | Re = 70-150 nm<br>Rth = 100-30 nm<br>azimuth = 0° |
| Substrate | Glass | Glass | Glass | Glass |
| Liquid crystal layer | IPS<br>azimuth = 90° | IPS<br>azimuth = 90° | IPS<br>azimuth = 90° | IPS<br>azimuth = 90° |
| Substrate | Glass | Glass | Glass | Glass |
| Retardation film 1-3 | None | None | None | None |
| Polarizing plate protective film | None, or<br>Re = 0-10 nm<br>Rth = −20-60 nm | None, or<br>Re = 0-10 nm<br>Rth = −20-60 nm | None, or<br>Re = 0-10 nm<br>Rth = −20-60 nm | None, or<br>Re = 0-10 nm<br>Rth = −20-60 nm |
| Polarizing film | 90° | 90° | 90° | 90° |
| Polarizing plate protective film | Re = 0-10 nm<br>Rth = −20-60 nm | Re = 0-10 nm<br>Rth = −20-60 nm | Re = 0-10 nm<br>Rth = −20-60 nm | Re = 0-10 nm<br>Rth = −20-60 nm |

| | 5 | 6 | 7 | 8 |
|---|---|---|---|---|
| Polarizing plate protective film | Re = 0-10 nm<br>Rth = −20-60 nm | Re = 0-10 nm<br>Rth = −20-60 nm | Re = 0-10 nm<br>Rth = −20-60 nm | Re = 0-10 nm<br>Rth = −20-60 nm |
| Polarizing film | 0° | 0° | 0° | 0° |
| Polarizing plate protective film | None or<br>Re = 0-10 nm<br>Rth = −20-60 nm | None or<br>Re = 0-10 nm<br>Rth = −20-60 nm | None or<br>Re = 0-10 nm<br>Rth = −20-60 nm | None or<br>Re = 0-10 nm<br>Rth = −20-60 nm |
| Retardation film 1-1 | Re = 40-100 nm<br>Rth = 150-330 nm<br>azimuth = 90° | Re = 20-50 nm<br>Rth = 80-180 nm<br>azimuth = 90° | Re = 40-100 nm<br>Rth = 150-300 nm<br>azimuth = 90° | Re = 70-160 nm<br>Rth = 30-100 nm<br>azimuth = 90° |
| Retardation film 1-2 | Re = 0-10 nm,<br>Rth = −150-350 nm<br>azimuth = 0° or 90° | None | None | None |
| Substrate | Glass | Glass | | |
| Liquid crystal layer | IPS<br>azimuth = 90° | VA mode | VA mode | VA mode |
| Substrate | Glass | Glass | | |
| Retardation film 1-3 | None | Re = 20-50 nm<br>Rth = 80-180 nm<br>azimuth = 0° | None | Re = 0-10 nm<br>Rth = 150--300 nm<br>azimuth = 0° or 90° |
| Polarizing plate protective film | None, or<br>Re = 0-10 nm<br>Rth = −20-60 nm | None, or<br>Re = 0-10 nm<br>Rth = −20-60 nm | None, or<br>Re = 0-10 nm<br>Rth = −20-60 nm | None, or<br>Re = 0-10 nm<br>Rth = −20-60 nm |
| Polarizing film | 90° | 90° | 90° | 90° |
| Polarizing plate protective film | Re = 0-10 nm<br>Rth = −20-60 nm | Re = 0-10 nm<br>Rth = −20-60 nm | Re = 0-10 nm<br>Rth = −20-60 nm | Re = 0-10 nm<br>Rth = −20-60 nm |

As the material for forming the first retardation film of the invention, polymer material excellent in optical performance, transparency, mechanical strength, stability to heat, moisture-shielding property, isotropy and the like is preferred, and any material may be employed provided that it satisfies the range of Re and Rth in Table 2. Examples include polycarbonate-based polymers, polyester-based polymers such as polyethylene terephthalate and polyethylene naphthalate, acrylic polymers such as polymethyl methacrylate, and styrene-based polymers such as polystyrene and acrylonitrile-styrene copolymer (AS resin). Cellulose acylate and thermoplastic norbornene-based resin can be used preferably. Examples of the thermoplastic norbornene-based resin include ZEONEX and ZEONOR manufactured by ZEON CORPORATION, and ARTON manufactured by JSR. In addition, polyolefins such as polyethylene and polypropylene, polyolefin-based polymers such as ethylene-propylene copolymer, vinyl chloride-based polymers, amide-based polymers such as nylon and aromatic polyamide, imide-based polymers, sulfone-based polymers, polyether sulfone-based polymers, polyetherether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers and mixed polymers thereof can be also mentioned as examples. In addition, a retardation film having a polymer layer formed by applying or transferring a low or high molecular weight liquid crystalline compound on a transparent substrate can be also used preferably.

According to the invention, since even a film that is not used as a retardation film usually due to a comparatively large wavelength dispersion property can be used as the first retardation film, raw materials can be selected widely, and a film that is more inexpensive and has high optical axis accuracy, or a film that has good kinetic properties and hardly occurs such error as frame-like light leakage can be employed.

[Second Retardation Film]

According to the invention, incompleteness of compensation caused by wavelength dispersion of the first retardation film used for suppressing light leakage of a liquid crystal display device at black level in an oblique direction is corrected only for a light of incomplete wavelength by the second retardation film. For this purpose, the second retardation film is formed so as to correspond to an alignment of a color filter corresponding to a wavelength to be corrected. Therefore, the second retardation film is not formed so as to correspond to all the colors, but is formed so as to correspond only to color filters of a part of colors to be compensated. In addition, the second retardation film is one for correcting the shift of compensation based on wavelength dispersion of the first retardation film, therefore it sufficiently functions with a very small retardation compared with the first retardation film. The second retardation film has such optical properties that the in-plane retardation (Re2) thereof is preferably ½ or less, more preferably ⅓ or less of the in-plane retardation of the first retardation film (Re1). More specifically, the in-plane retardation (Re2) of the second retardation film is preferably 0 nm-150 nm, more preferably 0 nm-110 nm.

As the second retardation film, a positive A plate (Nz value=Rth/Re+0.5=1) or a negative A plate (Nz value=0), a positive C plate (Nz value=−infinite) or a negative C plate (Nz value=+infinite) are also used preferably. In the case of the C plate, a retardation film having an in-plane retardation of approximately 0, and Rth is −150 nm-+150 nm is preferably used.

A positive and negative O plates having an inclined optical axis, a biaxial film having two optical axes, and a film in which liquid crystal is hybrid-aligned in the width direction of the film can be also used preferably.

When the second retardation film is formed adjacent to the color filter, the thickness of the film is preferably 0.02-5 μm, more preferably 0.05-3 μm form the viewpoint of assuring flatness of the inside of the cell.

As to the material for use in the retardation film, a stretched polymer material, polymer in which refractive index anisotropic fine particles have been dispersed and aligned, and the like can be used preferably provided that they have the aforementioned optical properties, but, when it is formed adjacent to a color filter, liquid crystalline compounds and compositions are more preferred from the viewpoint of large refractive index anisotropy and capability of decreasing the thickness of the retardation film. As to the phase of liquid crystal, any of nematic phase, cholesteric phase, smectic phase, columnar phase, and lyotropic phase can be used preferably. The retardation layer formed form a liquid crystalline compound having the aforementioned optical properties can be formed by applying a liquid crystalline compound or a composition containing the same on a color filter or a glass substrate, aligning the liquid crystalline compound in an intended alignment state, and then fixing the same by mask exposure with an actinic ray. A positive A plate can be formed by aligning a rod-shaped liquid crystalline compound parallel to a base material, and a positive C plate can be formed by aligning the same perpendicular to a base material. A negative A plate can be formed by perpendicularly aligning a discotic liquid crystalline compound, and a negative C plate can be formed by horizontally aligning the same. An O plate can be formed by obliquely aligning a liquid crystalline compound, and a biaxial film can be formed by aligning a biaxial liquid crystal.

Optical properties of these can be controlled by adjusting the thickness of a retardation film to be formed by adjusting a coating amount of liquid crystal.

<<Rod-Shaped Liquid Crystalline Compound>>

The second retardation film of the invention may be formed from a composition containing a rod-shaped liquid crystalline compound. Examples of the preferably used rod-shaped liquid crystalline compound include azomethines, azoxys, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenylpyrimidines, phenyldioxanes, tolanes and alkenylcyclohexylbenzonitriles. In addition to above-described low molecular weight liquid crystalline molecules, high molecular weight liquid crystalline molecules may be also usable. Examples of low molecular weight rod-shaped liquid crystalline compounds having a polymerizable group, which are used particularly preferably, include the rod-shaped liquid crystalline compound represented by the following formula (I).

$$Q^1-L^1-A^1-L^3-M-L^4-A^2-L^2-Q^2 \qquad \text{Formula (I)}$$

wherein $Q^1$ and $Q^2$ each independently is a polymerizable group, and $L^1$, $L^2$, $L^3$ and $L^4$ each represents a single bond or a divalent linking group, and it is preferred that at least one of $L^3$ and $L^4$ is —O—CO—O— (carbonate group). $A^1$ and $A^2$ each independently represents a spacer group having 2-20 carbon atoms, and m represents a mesogen group.

Hereinafter, a rod-shaped liquid crystalline compound having a polymerizable group shown by the formula (I) will be described in more detail.

In the formula (I), $Q^1$ and $Q^2$ each independently is a polymerizable group. Polymerization reaction of the polymerizable group is preferably an addition polymerization (including ring-opening polymerization) or condensation polymerization. In other words, the polymerizable group is preferably a functional group capable of addition polymerization reaction or condensation polymerization reaction.

Examples of the polymerizable group are shown below.

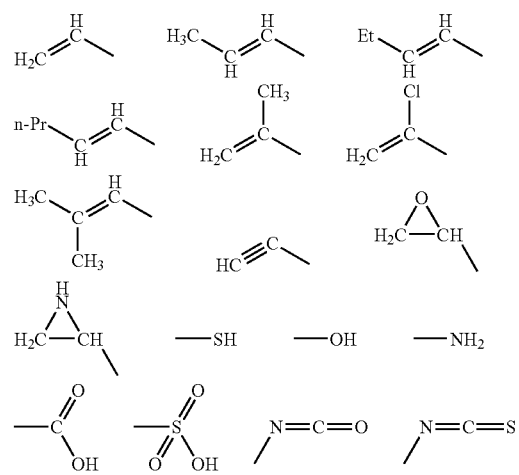

Divalent linking group represented by $L^1$, $L^2$, $L^3$ and $L^4$ each is preferably a divalent linking group selected from —O—, —S—, —CO—, —NR²—, —CO—O—, —O—CO—O—, —CO—NR²—, —NR²—CO—, —O—CO—, —O—CO—NR²—, —NR²—CO—O— and —NR²—CO—NR²—. The $R^2$ is an alkyl group having 1-7 carbon atoms or a hydrogen atom. In this case, at least one of L³ and L⁴ is preferably —O—CO—O— (carbonate group). In the formula (I), Q¹-L¹- and Q²-L²- each independently is preferably CH₂=CH—CO—O—, CH₂=C(CH₃)—CO—O— or CH₂=C(Cl)—CO—O—CO—O—, more preferably CH₂=CH—CO—O—.

A¹ and A² each independently represents a spacer group having 2-20 carbon atoms, preferably an aliphatic group having 2-12 carbon atoms, more preferably an alkylene group having 2-12 carbon atoms. The spacer group is preferably chained, and may include not adjacent oxygen group or sulfur group. The spacer group may have a substituent. Examples of the substituent include a halogen atom (fluorine, chlorine, bromine), a cyano group, a methyl group and an ethyl group.

As a mesogen group represented by M, publicly known mesogen groups can be widely adopted. In particular, a group represented by the formula (II) below is preferred.

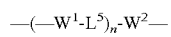 Formula (II)

wherein W¹ and W² each independently represents a divalent cyclic aliphatic group, a divalent aromatic group or a divalent heterocyclic group, and L⁵ represents a single bond or a linking group. Specific examples of the linking group include specific examples of groups represented by L¹-L⁴ in the formula (I), —CH₂—O— and —O—CH₂—. n represents 1, 2 or 3.

Examples of W¹ and W² include a 1,4-cyclohexanediyl group, a 1,4-phenylene group, a pyrimidine-2,5-diyl group, a pyridine-2,5-diyl group, a 1,3,4-thiadiazole-2,5-diyl group, a 1,3,4-oxadiazole-2,5-diyl group, a naphthalene-2,6-diyl group, a naphthalene-1,5-diyl group, a thiophene-2,5-diyl group, and a pyridazine-3,6-diyl group. In the case of 1,4-cyclohexanediyl group, there are structural isomers of the trans form and the cis form, and, in the invention, either of these isomers may be sufficient, and a mixture thereof at an arbitrary ratio may be sufficient. The trans form is more preferred. W¹ and W² each may have a substituent. Examples of the substituent include a halogen atom (fluorine, chlorine, bromine, iodine), a cyano group, an alkyl group having 1-10 carbon atoms (such as a methyl group, ethyl group, propyl group), an alkoxy group having 1-10 carbon atoms (such as a methoxy group, ethoxy group), an acyl group having 1-10 carbon atoms (such as a formyl group, acetyl group), an alkoxy carbonyl group having 1-10 carbon atoms (such as a methoxycarbonyl group, ethoxycarbonyl group), an acyloxy group having 1-10 carbon atoms (such as an acetyloxy group, propionyloxy group), a nitro group, a trifluoromethyl group and a difluoromethyl group.

Preferable fundamental skeletons of the mesogen group represented by the formula (II) are exemplified below. They may be substituted by the aforementioned substituent.

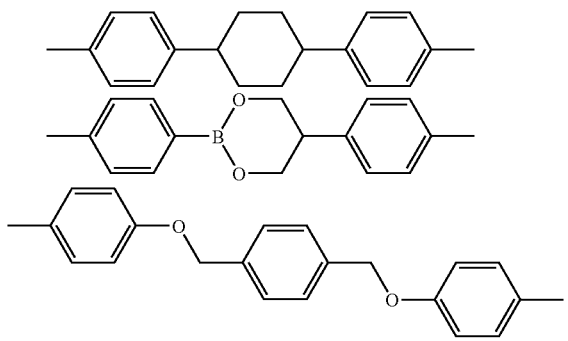

-continued

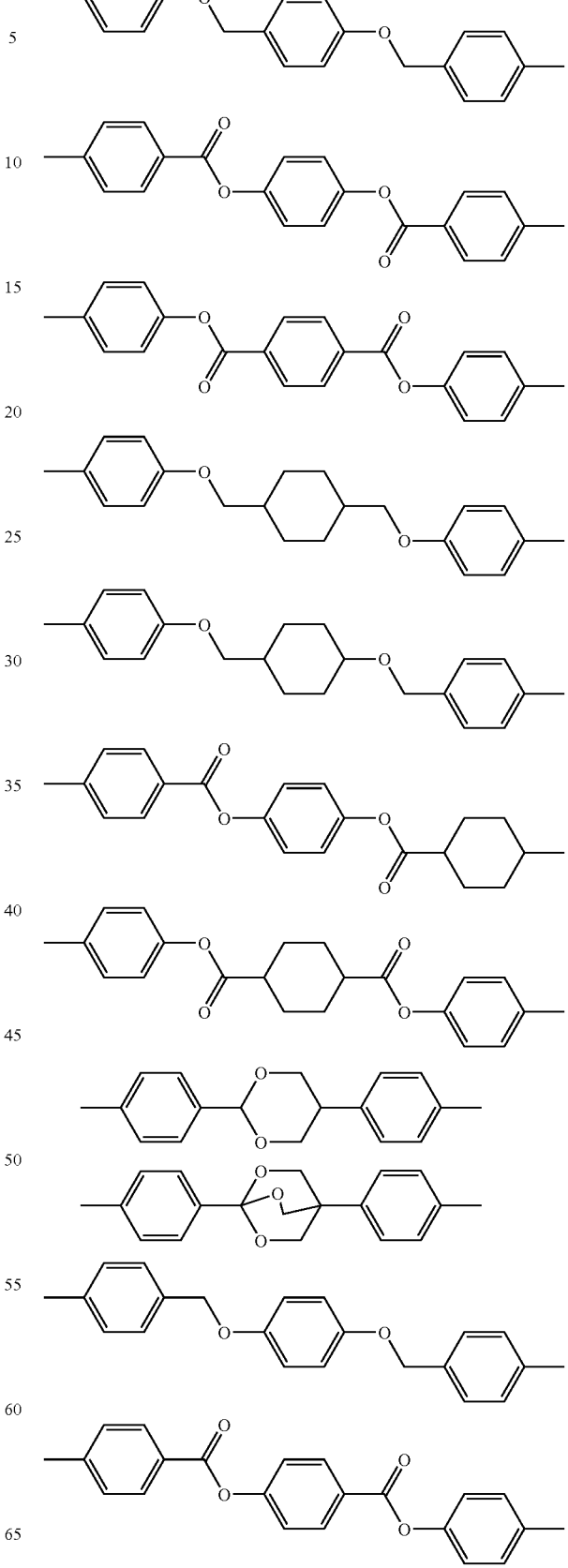

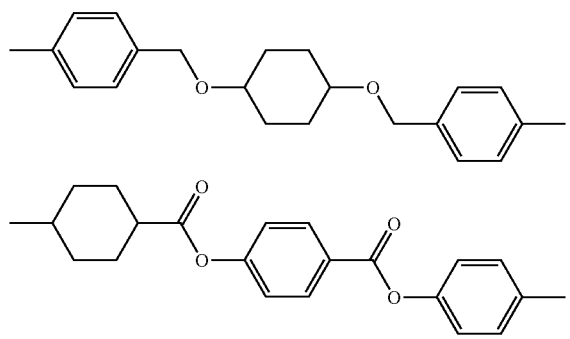
Examples of the compound represented by the formula (I) are shown below, but the invention is not limited to these. The compound represented by the formula (I) can be synthesized by a method described in JP-T-11-513019 (the term "JP-T" as used herein means a published Japanese translation of a PCT patent application).
I-1
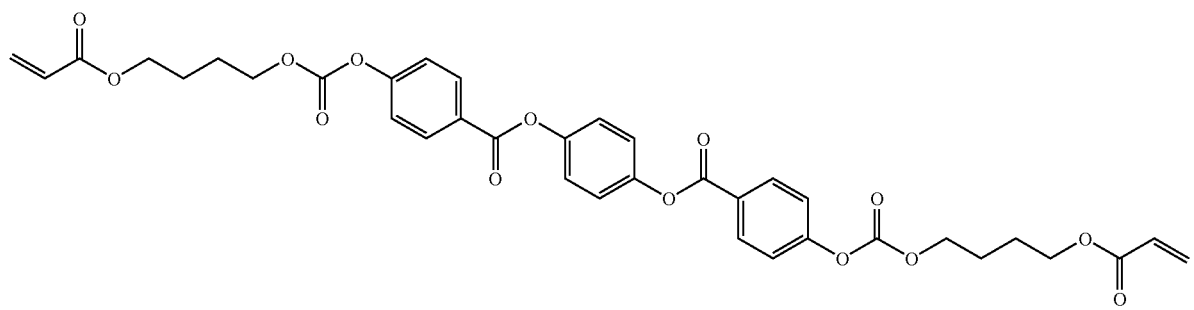
I-2
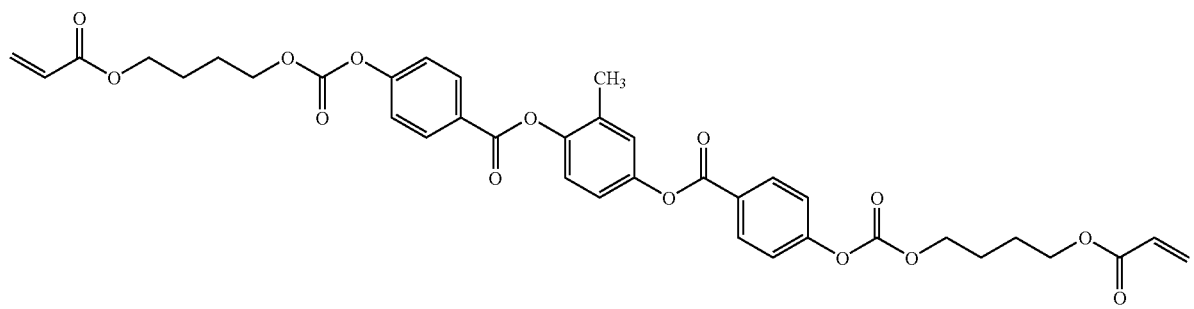
I-3
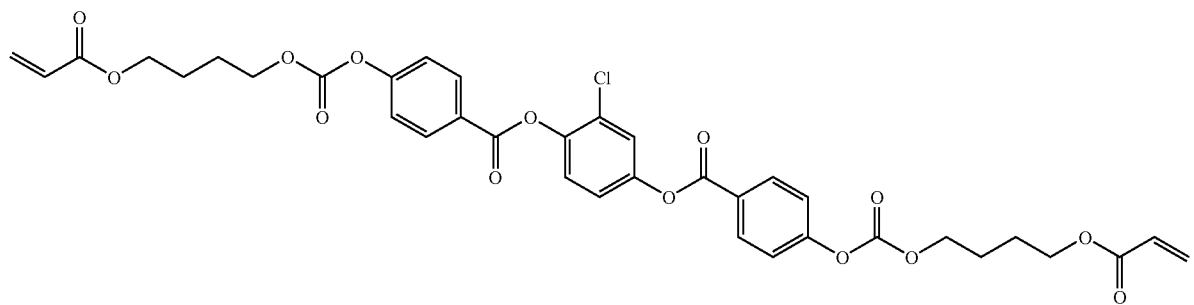

-continued
I-4
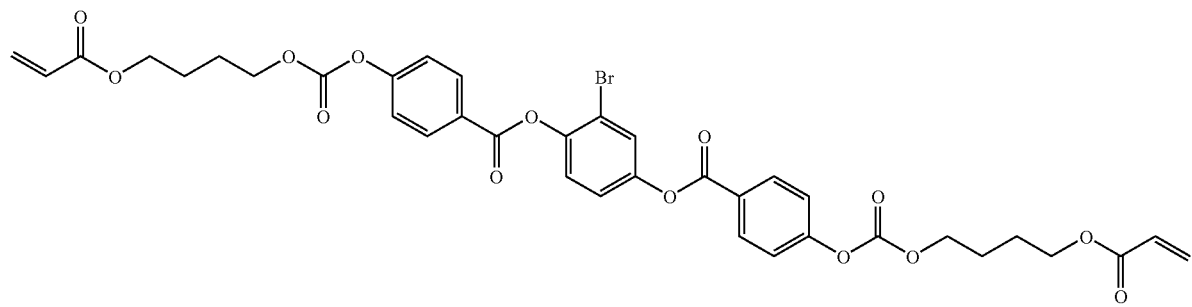
I-5
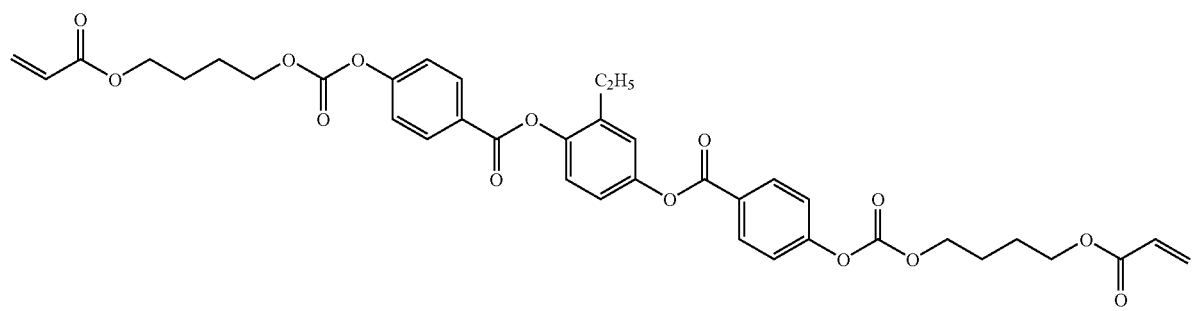
I-6
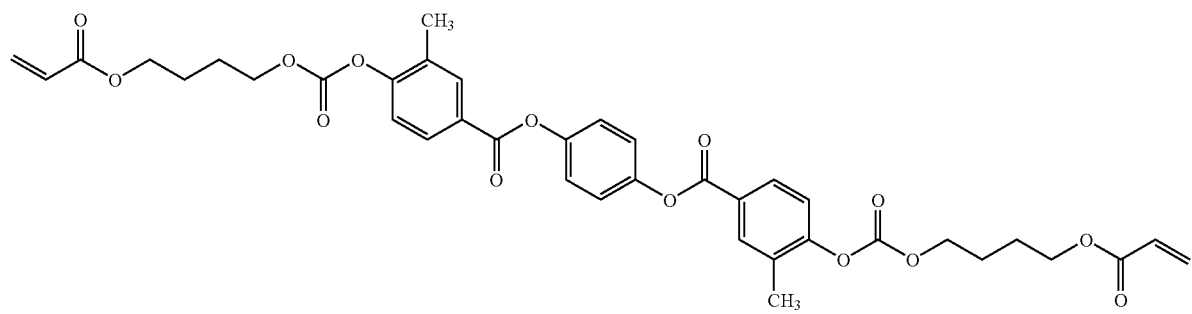
I-7
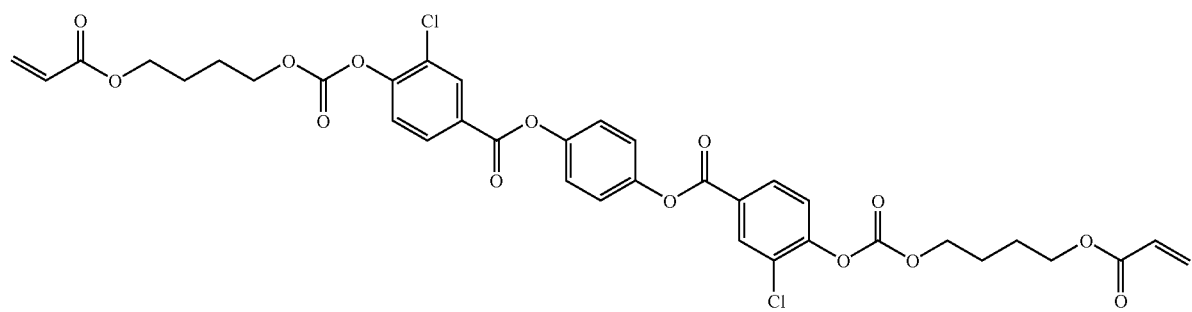

<<Discotic Liquid Crystalline Compound>>

In the invention, discotic liquid crystalline compounds described in various documents (C. Destrade et al., Mol. Crysr. Liq. Cryst., vol. 71, page 111 (1981); EdbyTheChemical Society of Japan, Kikan Kagaku Sosetsu, No. 22, Ekisho no Kagaku (Quaternary Chemistry General Discussion, No. 22, Chemistry of Liquid Crystal) Chap. 5, Chap. 10 Section 2 (1994); B. Kohne et al., Angew. Chem. Soc. Chem. Comm., page 1794 (1985); J. Zhang et al., J. Am. Chem. Soc., vol. 116, page 2655 (1994)). Polymerization of the discotic liquid crystalline compound can be effected according to the description of JP-A-8-27284 or the like.

The discotic liquid crystalline compound preferably has a polymerizable group so as to make fixation through polymerization possible. For example, a construction, in which a polymerizable group is bonded to a discotic core of a discotic liquid crystalline compound as a substituent, may be considered, but, when a polymerizable group is directly bonded to a discotic core, occasionally it may be difficult to maintain an alignment state in polymerization reaction. In such case, a structure having a linking group between a dichotic core and a polymerizable group is preferred. Specifically, as a discotic liquid crystalline compound having a polymerizable group, compounds represented by the following formula are preferred.

$$D(-L-P)_{n2}$$

wherein D is a dichotic core, L is a divalent linking group, P is a polymerizable group and n2 is an integer of 4-12. Preferable specific examples of the dichotic core (D), the divalent linking group (L) and the polymerizable group (P) in the formula are, respectively, (D1)-(D15), (L1)-(L25), (P1)-(P18) described in JP-A-2001-4837, and the content described in the gazette can by used preferably.

<<Method for Forming the Second Retardation Film>>

The retardation layer 2 (the second retardation film) formed from a liquid crystalline compound can be formed by applying a coating liquid including a liquid crystalline compound, and, according to need, an after-mentioned polymerization initiator, an air interface alignment agent or another additive onto a vertical alignment film formed on a color filter or onto a color filter, making the same align, fixing the aligned state by fractional exposure, and removing the liquid crystalline compound on a color filter for which formation of the second retardation film is unnecessary.

As to a solvent for use in preparation of the coating liquid, an organic solvent is preferably used. Examples of the organic solvent include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), ethers (e.g., tetrahydrofuran, 1,2-dimethoxyethane). Alkyl halides and ketones are preferred. Two or more types of organic solvents may be used in combination. Application of the coating liquid can be effected by a publicly known method (e.g., an extrusion coating method, a direct gravure coating method, a reverse gravure coating method, a die coating method).

Fixation of the aligned liquid crystalline compound is preferably performed by polymerization reaction of a polymerizable group (P) introduced into the liquid crystalline compound. The polymerization reaction includes thermal polymerization reaction employing a thermal polymerization initiator, and photo polymerization reaction employing a photo polymerization initiator, and photo polymerization reaction is preferred. Examples of the photo polymerization initiator include α-carbonyl compounds (described in U.S. Pat. Nos. 2,367,661, 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127, 2,951,758), a combination of triarylimidazole dimmer and p-aminophenyl ketone (described in U.S. Pat. No. 3,549,367), acridine and phenazine compounds (described in JP-A-60-105667, U.S. Pat. No. 4,239,850), and oxadiazole compounds (described in U.S. Pat. No. 4,212,970).

The use amount of the photo polymerization initiator is preferably 0.01-20% by mass, more preferably 0.5-5% by mass of the solid content of a coating liquid. In light irradiation for polymerization of a liquid crystalline molecule, use of ultraviolet rays is preferred. Irradiation energy is preferably 10 mJ/cm$^2$-50 J/cm$^2$, further preferably 30 mJ/cm$^2$-800 mJ/cm$^2$. In order to accelerate photo polymerization reaction, the light irradiation may be performed under heated conditions.

The arrangement of the second retardation film in a region corresponding to an intended color filter can be achieved by performing ultraviolet ray exposure through a mask in a state in which a liquid crystalline compound has been aligned, and then washing away a region where the retardation film is unexposed and unnecessary with a solvent capable of dissolving the liquid crystalline compound. In addition, it can be achieved by heating the support after the exposure up to a temperature higher than the upper limit temperature of the liquid crystal phase of a coated liquid crystalline compound and exposing the whole surface thereof with ultraviolet rays. In this case, a composition (coating liquid) is fixed and remains in positions for which the retardation film is unnecessary in a state of isotropic glass, but it does not function as the retardation film optically. An exposure through a mask is effected preferably at 130° C. or less, more preferably at 100° C. or less, most preferably at 50° C. or less, from the viewpoint of suppressing deformation of the mask by heat. When such exposure apparatus as a digital ultraviolet exposure device, which does not use a mask, is employed, a preferable range of temperature at exposure is 150° C. or less.

[Alignment Film]

In order to align a liquid crystalline compound upon forming the second retardation film, use of an alignment film is preferred. The alignment film can be provided by such means as rubbing treatment of an organic compound (preferably polymer), oblique evaporation of an inorganic compound, formation of a micro groove layer, or accumulation of an organic compound (e.g., ω-tricosanoic acid, dioctadecylmethylammonium chloride, methyl stearate) according to a Langmuir-Blodgett method (LB film). Further, such alignment films are known that generate alignment function by application of an electric field, application of a magnetic field, or irradiation of light.

In order to align the direction of liquid crystal in an intended direction, use of an alignment film formed by rubbing treatment of polymer is particularly preferred. Rubbing treatment is effected by rubbing the surface of a polymer layer several times with paper or cloth unidirectionally. In the case of vertically aligning a rod-shaped liquid crystal, and in the case of horizontally aligning a discotic liquid crystal, the rubbing treatment is not required.

Type of polymer for use in an alignment film can be determined in accordance with alignment (particularly an average tilt angle) of a liquid crystalline compound. For example, in order to align horizontally a liquid crystalline compound, a polymer that does not lower the surface energy of an alignment film (usual aligning polymer) is used. As to specific types of polymers, various documents about a liquid crystal cell or an optical compensation sheet can be referred to.

In order to align vertically a liquid crystalline compound on an alignment film side, it is important to lower the surface energy of the alignment film. Specifically, the surface energy of the alignment film is lowered by a functional group of polymer to lead a liquid crystalline compound to a state of being set up. As a functional group for lowering the surface energy of an alignment film, a fluorine atom and a hydrocarbon group having 10 or more carbon atoms are effective. In order to allow a fluorine atom or the hydrocarbon group to exist on the surface of an alignment film, a fluorine atom or the hydrocarbon group is preferably introduced into a side chain, instead of the main chain, of polymer.

Any alignment film preferably has a polymerizable group for a purpose of improving adhesiveness between a liquid crystalline compound and a transparent support. A polymerizable group can be introduced by introducing a repeating unit having a polymerizable group into a side chain, or as a substituent of a cyclic group. Use of an alignment film capable of forming a chemical bond with a liquid crystalline compound at the interface is more preferred. Examples of such alignment films are described in JP-A-9-152509. Thickness of an alignment film is preferably 0.01-5 μm, further preferably 0.05-1 μm.

As to a method for applying an alignment film, a spin coating method, a dip coating method, a curtain coating method, an extrusion coating method, a rod coating method or a roll coating method is preferred. In particular, a rod coating method is preferred. The film preferably has a dried thickness of 0.01-2 μm.

In forming the second retardation film, there are also such methods that, without using the alignment film, application is performed after rubbing treatment of a color filter or a glass substrate, or direct application is performed without rubbing to allow the same to be aligned.

In order to align uniformly a discotic liquid crystalline compound, control of an alignment direction with a vertical alignment film having been subjected to rubbing treatment is preferred. But, for the purpose of vertical alignment of a rod-shaped liquid crystalline compound, no rubbing treatment is preferably performed. Incidentally, it suffices to form a retardation layer by aligning a liquid crystalline compound using an alignment film and then fixing the liquid crystalline compound in the as-aligned state, and to transfer the retardation layer alone on a polymer film (or a transparent support).

<<Air Interface Alignment Agent>>

Usually, since a liquid crystalline compound has such character that it aligns obliquely on the air interface side, in order to obtain a state in which the compound is in a uniform vertical or horizontal alignment, alignment control of the liquid crystal compound to be vertical or horizontal is necessary on the air interface side. For this purpose, it is preferred to incorporate such compound in a coating liquid that is unevenly distributed on the air interface side and affects the liquid crystal compound to align vertically or horizontally through an excluded volume effect or electrostatic effect thereof, and form a retardation film.

As a compound that makes a liquid crystalline compound align vertically, such polymer is preferably used as a maleimide group that contains a stiff structural unit having an excluded volume effect. Further, compounds described in JP-A-2002-20363, JP-A-2002-129162, JP-A-2004-53981, JP-A-2004-4688, JP-A-2004-139015 and JP-A-2005-97357 can be used as an air interface alignment agent. By blending these compounds, application property is improved and occurrence of unevenness or repellency is suppressed.

As the compound capable of aligning horizontally a liquid crystalline compound, compounds described in JP-A-2000-344734 and JP-A-2000-345164 can be used as an air interface horizontal alignment agent. Use amount of the air interface alignment agent in a liquid crystal coating liquid is preferably 0.05% by mass-5% by mass. When a fluorine-containing air interface alignment agent is used, 1% by mass or less is preferred.

<<Other Materials in the Retardation Layer>>

Along with the above-described liquid crystalline compound, plasticizer, surfactant, polymerizable monomer or the like may be used to improve uniformity of a coated film, strength of a film, alignment property of the liquid crystalline compound, and the like. These materials preferably have compatibility with the liquid crystalline compound and do not disturb the alignment. As the polymerizable monomer, a radical polymerizable or cation polymerizable compound can be mentioned. A polyfunctional radical polymerizable monomer is preferred, and one copolymerizable with a liquid crystalline compound containing the above-described polymerizable group is preferred. For example, ones described in JP-A-2002-296423, paragraphs [0018]-[0020] can be mentioned. Addition amount of the compound is in a range of normally 1-50% by mass, preferably 5-30% by mass, relative to the liquid crystalline compound.

As surfactant, conventionally publicly known ones are mentioned, and, in particular, a fluorine-containing compound is preferred. Specifically, for example, compounds described in JP-A-2001-330725, paragraphs [0028]-[0056], compounds described in JP-A-2005-62673, paragraphs [0069]-[0126] can be mentioned.

The polymer used with a liquid crystal compound can preferably increase viscosity of a coating liquid. As an example of the polymer, cellulose ester can be mentioned. Preferable examples of the cellulose ester include those described in JP-A-2000-155216, paragraph [0178]. So as not to disturb the alignment of a liquid crystal compound, the addition amount of the polymer is preferably in a range of 0.1-10% by mass, more preferably in a range of 0.1-8% by mass relative to the liquid crystalline compound. The phase transition temperature of a liquid crystalline compound between a discotic nematic liquid crystal phase and a solid phase is preferably 70-300° C., more preferably 70-170° C.

[Polarizing Plate]

The polarizing plate for use in the invention is a polarizing plate provided with a polarizing film, and a protective film on at least one surface of the polarizing film, preferably on both surfaces of the polarizing film.

A preferable polarizing film is obtained by soaking a film composed of a polyvinyl alcohol or the like with iodine and stretching the same.

As the protective film, such film is preferred that has no absorption in a visible light region, a light transmittance of 80% or more, and a small light retardation based on birefringence. Specifically, an in-plane Re is preferably 0-30 nm, more preferably 0-15 nm, most preferably 0-5 nm. Further, retardation Rth in the thickness direction is preferably −40-40 nm, more preferably −20-20 nm, most preferably −10-10 nm. Films having the property can be used preferably, and, from the viewpoint of durability, cellulose acylate and norbornene-based films such as ZEONEX and ZEONOR (both manufactured by ZEON CORPORATION), and ARTON (manufactured by JSR) are more preferred. As a method for reducing Rth of a cellulose acylate film, methods described in JP-A-11-246704 and JP-A-2001-247717 can be mentioned. The Rth can be also reduced by reducing the thickness of a cellulose acylate film. The thickness of each of a cellulose acylate film as a protective film for the first polarizing film and as a protective film for the second polarizing film is preferably 10-100 μm, more preferably 10-60 μm, further preferably 20-45 μm.

<Adhesive>

As an adhesive for the polarizing film and the protective film, although there is no particular limitation, PVA-based resin (including PVA modified with an acetoacetyl group, a sulfonic acid group, a carboxyl group, oxyalkylene group, or the like), an aqueous solution of a boron compound can be mentioned, and, out of these, PVA-based resin is preferred. The thickness of the adhesive layer is preferably 0.01-10 μm, particularly preferably 0.05-5 μm after drying.

EXAMPLES

Further specific characteristics of the invention will be described below on the basis of Examples and Comparative Examples. The material, use amount, percentage, treatment content, treatment procedure and the like shown in the following Examples can be arbitrarily changed within a range that does not result in deviation from the purpose of the invention. Accordingly, the scope of the invention should not be construed restrictively by specific examples shown below.

Example 1

According to FIG. 2, a method for manufacturing the liquid crystal display device of the Example will be described. The number in ( ) in the description corresponds to the number in FIG. 2.

<Manufacture of a Substrate with a Color Filter (5, 6)>

After washing a commercially available glass substrate having a thickness of 0.7 mm, a light-shielding layer (thickness: 0.1 μm) composed of metal chrome was formed on the whole one surface of the substrate by a sputtering method. Next, by performing application of a photosensitive resist, mask exposure, development, etching and peeling of the resist layer for the light-shielding layer according to a usual photolithographic method, a black matrix was formed.

Next, on the whole surface of the substrate on which the black matrix had been formed, a photosensitive colored material for red pattern (Color Mosaic CR-7001, manufactured by FUJI FILM OLIN Co., Ltd.) was applied by a spin coating method to form a red photosensitive resin layer, which was subjected to pre-baking (85° C., 5 minutes). Then, by using a photo mask for an intended colored pattern, the red photosensitive resin layer was alignment-exposed, which was developed with a developer (a diluted solution of a developer CD for the Color Mosaic, manufactured by FUJI FILM OLIN CO., Ltd.), which was then subjected to post-baking (200° C., 30 minutes) to form a red pattern (thickness: 1.5 μm) (6R) in an intended position relative to the black matrix pattern.

In the same way, a photosensitive colored material for green pattern (Color Mosaic CG-7001, manufactured by FUJI FILM OLIN Co., Ltd.) was used to form a green pattern (thickness: 1.5 μm) (6G) in an intended position relative to the black matrix pattern. Further, a photosensitive colored material for blue pattern (Color Mosaic CB-7001, manufactured by FUJI FILM OLIN Co., Ltd.) was used to form a blue pattern (thickness: 1.5 μm) (6B) in an intended position relative to the black matrix pattern, thereby forming a substrate with a color filter.

<Manufacture of the Second Retardation Film 1 (12)>

Next, on the whole surface of the substrate with a color filter, a solution prepared by dissolving 1.8 g of discotic liquid crystalline compound below, 0.2 g of ethyleneoxide-modified trimethylolpropane triacrylate (V#360, manufactured by Osaka Organic Chemical Industry Ltd.), 0.06 g of a photo polymerization initiator (Irgacure-907, manufactured by Ciba-Geigy K.K.), 0.02 g of a sensitizer (Kayacure DETX, manufactured by NIPPON KAYAKU CO., LTD.) and 0.01 g of an air interface side horizontally aligning agent (compound A2) in 20 g of methyl ethyl ketone was applied by a spin coating method, which was heated in a thermostatic oven at 125° C. for 2 minutes to align the discotic liquid crystalline compound. Then, the discotic liquid crystal layer was alignment-exposed using a photomask for blue-colored pattern at 80° C. to cross-link the discotic liquid crystalline compound. After that, it was cooled to room temperature, the substrate was developed with methyl ethyl ketone to form a second retardation film (12) of a negative C plate having a thickness of 0.26 μm, Re=0 nm (λ=450 nm) and Rth=18 nm (λ=450 nm) on the blue filter. In the same way, but adjusting the spin rate, a second retardation film (13) having a thickness of 0.33 μm, Re=0 nm (λ=650 nm) and Rth=18 nm (λ=650 nm) was formed on the R. Then, it was heated at 200° C. for 10 minutes to complete polymerization. Then, on the substrate on which the second retardation film had been formed, a negative type transparent photosensitive resin material (NN series manufactured by JSR) was applied by a spin coating method, which was exposed to form a transparent protective layer having a thickness of 1 μm (not shown). Finally, 1000 Å of ITO was formed by a sputtering method to form a glass substrate (5, 6) with the second retardation film 1. On that, a polyimide film was provided as an alignment film, which was subjected to rubbing treatment.

Discotic Liquid Crystalline Compound

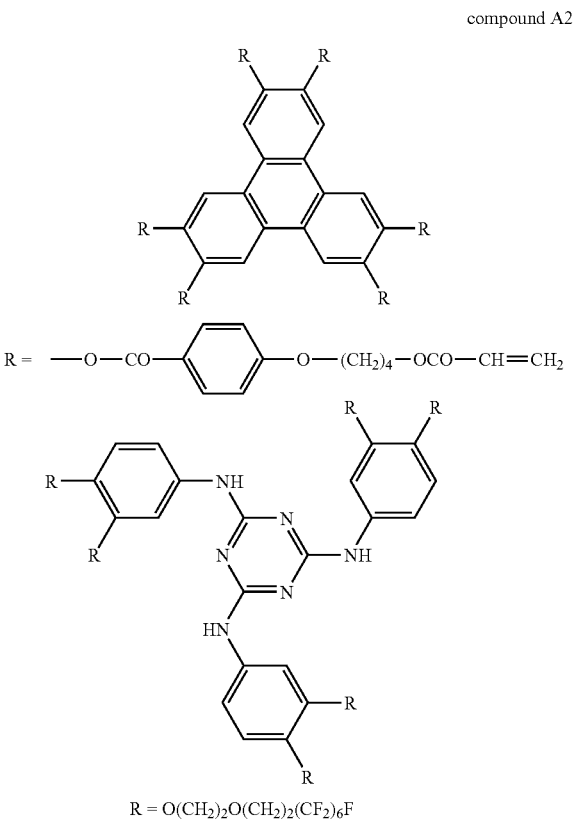

compound A2

<Manufacture of a First Retardation Film 1 (4)>

On both sides of a polycarbonate film having a thickness of 80 μm and Re of 250 nm, a heat-shrinkable film composed of a uniaxially-stretched polyester film was adhered via an acrylic adhesive layer so that slow phase axes thereof crossed orthogonally, which was stretched using a stretching apparatus while being heated to 160° C. to shrink the heat-shrinkable film, then the heat-shrinkable film was peeled off to give a first retardation film 1 (4).

An auto-birefringence index meter (KOBRA-21ADH, manufactured by Oji Scientific Instruments) was used to measure light incident angle dependency of Re and calculate optical properties to confirm that the first retardation film 1 had Re of 275 nm, Rth of −28 nm and Nz of 0.4.

<Manufacture of a Polarizing Plate Protective Film 1 (3, 9)>
(Polarizing Plate Protective Film 1)

A following composition was put in a mixing tank, which was stirred with heating to dissolve respective components and prepare a cellulose acetate solution A.

| <Composition of a cellulose acetate solution A> | |
|---|---|
| Cellulose acetate having a substitution degree of 2.86 | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 part by mass |
| Methanol (second solvent) | 54 parts by mass |
| 1-Butanol | 11 parts by mass |

In another mixing tank, a following composition was put and stirred with heating to dissolve respective components and prepare an additive agent solution B-1.

| <Composition of additive agent solution B-1> | |
|---|---|
| Methylene chloride | 80 parts by mass |
| Methanol | 20 parts by mass |
| An optical anisotropy-lowering agent below | 40 parts by mass |

An optical anisotropy-lowering agent

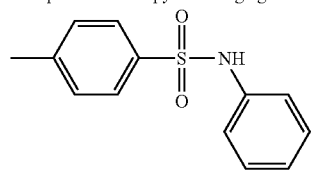

To 477 parts by mass of the cellulose acetate solution A, 40 parts by mass of the additive agent solution B-1 was added, which was stirred sufficiently to prepare a dope. The dope was cast from a casting port onto a drum having been cooled to 0° C. The film was peeled off at a solvent content of 70% by mass, and fixed with a pin tenter (pin tenter shown in FIG. 3 of JP-A-4-1009) at both ends in the width direction of the film, and dried in the state of solvent content of 3-5% by mass, while maintaining the distance for defining the draw ratio of 3% in the lateral direction (the direction perpendicular to the machine direction). Then, by conveying the film between rolls of a heat treatment apparatus, it was further dried to manufacture a polarizing plate protective film 1 (3, 9) having a thickness of 40 μm.

An auto-birefringence index meter (KOBRA-21ADH, manufactured by Oji Scientific Instruments) was used to measure light incident angle dependency of Re and calculate optical properties to confirm that Re was 1 nm and Rth was 3 nm.

<Manufacture of a Polarizing Plate A>

Next, iodine was adsorbed to a stretched polyvinyl alcohol film to manufacture a polarizing film (10). On one side of the polarizing film (10), a film (11) obtained by subjecting a commercially available cellulose acetate film (FUJITAC TD80UF, thickness: 80 μm, Re=2 nm, Rth=48 nm, manufactured by Fuji Photo Film Co., Ltd.) to saponification treatment was stuck using a polyvinyl alcohol-based adhesive. On the other surface of the polarizing film (10), the polarizing plate protective film 1 (9) manufactured above was stuck in the same way using a polyvinyl alcohol-based adhesive to manufacture a polarizing plate A.

<Manufacture of a Polarizing Plate B>

Next, iodine was adsorbed to a stretched polyvinyl alcohol film to manufacture a polarizing film (2). On one side of the polarizing film (2), a film (1) obtained by subjecting a commercially available cellulose acetate film (FUJITAC TD80UF, thickness: 80 μm, Re=2 nm, Rth=48 nm, manufactured by Fuji Photo Film Co., Ltd.) to saponification treatment was stuck using a polyvinyl alcohol-based adhesive. On the other surface of the polarizing film (2), the polarizing plate protective film 1 (3) manufactured above was stuck in the same way using a polyvinyl alcohol-based adhesive. Subsequently, on the polarizing plate protective film 1 side, the first retardation film 1 (4) manufactured above was stuck using an acrylic adhesive so that the slow phase axis thereof became parallel to the transmission axis of the polarizing film to form a polarizing plate B.

<Manufacture of an IPS Mode Liquid Crystal Cell 1>

A polyimide film was provided as an alignment film on a glass substrate (8) having one TFT, which was subjected to rubbing treatment. The glass substrate (8) and substrates (5, 6, 12, 13) having the second retardation film were superimposed and stuck while facing alignment films so that a distance of substrates (gap; d) was 3.9 μm and two glass substrates had rubbing directions parallel with each other. Then, a nematic liquid crystal composition having a refractive index anisotropy (Δn) of 0.0769 and a permittivity anisotropy (Δε) of positive 4.5 was sealed. The d·Δn value of a liquid crystal layer (7) was 300 nm. Thus, an IPS mode liquid crystal cell 1 was manufactured. On the outside of the substrate (5, 6, 12, 13) side with the second retardation film of the manufactured IPS mode liquid crystal cell 1, the polarizing plate B was stuck so that the absorption axis thereof crossed orthogonally to the rubbing direction of the liquid crystal cell (the slow phase axis direction of the liquid crystal molecule at the time of black level). Subsequently, on the outside of the other substrate (8) side of the liquid crystal cell, the polarizing plate A manufactured above was stuck in the crossed-Nicols arrangement to manufacture a liquid crystal display device 1.

Leak light of the manufactured liquid crystal display device was measured. First, the IPS mode liquid crystal cell was put on a viewing box disposed in a dark room in a state in which no polarizing plate was stuck. Luminance 1 was measured with a luminance meter disposed in 45° in left direction on the basis of the rubbing direction of the liquid crystal cell, and in 60° direction from the normal direction of the liquid crystal cell at a distance of 1 m.

Next, on the same viewing box, the liquid crystal display device 1 was disposed in the same way and luminance 2 was measured at the dark level. A value representing the luminance 2 relative to the luminance 1 in percentage was defined as leak light. The measured leak light was 0.04%. In addition, transmission spectrum at dark level in the same azimuth and transmission spectrum in the panel front direction were measured, and Δu'v' was searched to give 0.080.

Example 2

Manufacture of the Second Retardation Film 2

The substrate with a color filter manufactured in Example 1 was manufactured similarly. On the whole surface thereof, polyimide was applied as an alignment film, which was subjected to rubbing parallel to the long side of the substrate. A solution prepared by dissolving 1.8 g of a rod-shaped liquid crystalline compound (Compound A4) below, 0.2 g of ethyleneoxide-modified trimethylolpropane triacrylate (V#360, manufactured by Osaka Organic Chemical Industry Ltd.), 0.06 g of a photo polymerization initiator (Irgacure-907, manufactured by Ciba-Geigy K.K.), 0.02 g of a sensitizer (Kayacure DETX, manufactured by NIPPON KAYAKU CO., LTD.) and 0.01 g of an air interface side horizontally aligning agent (compound A2) in 30 g of methyl ethyl ketone was applied by a spin coating method, which was heated in a thermostatic oven at 80° C. for 2 minutes to align the liquid crystalline compound. Then, the liquid crystal layer was alignment-exposed using photomasks for blue-colored pattern and red-colored pattern at 45° C. to cross-link the liquid crystalline compound. After that, it was cooled to room temperature, the substrate was developed with methyl ethyl ketone to form a second retardation film 2 of a positive A plate having a thickness of 0.18 μm, Re=18 nm (λ=550 nm) and Rth=9 nm (λ=550 nm) on the blue filter and the red filter. After that, it was heated at 200° C. for 10 minutes to complete polymerization. Then, on the substrate on which the second retardation film had been formed, a negative type transparent photosensitive resin material (NN series, manufactured by JSR) was applied by a spin coating method, which was exposed to form a transparent protective layer having a thickness of 1 μm. Finally, 1000 Å of ITO was formed by a sputtering method to form a glass substrate with the second retardation film. On the substrate, "JALS-2021-R1" (manufactured by JSR) was applied to form a vertical alignment film thereon.

Rod-Shaped Liquid Crystalline Compound (Compound A4)

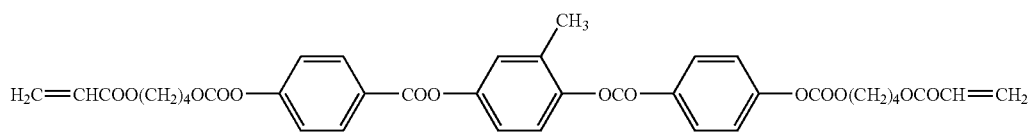

<Manufacture of First Retardation Film 2>

A composition described below was put in a mixing tank, which was stirred with heating to dissolve respective components to prepare a cellulose acetate solution. The solution was filtrated with a filter paper having a retaining particle size of 4 μm and a filtration time of 35 seconds (No. 63, manufactured by Advantech) under a pressure of 5 kg/cm² or less.

| Composition of Cellulose Acetate Solution | |
|---|---|
| Cellulose acetate having an acetylation degree of 60.9% (polymerization degree: 300, Mn/Mw = 1.5) | 100 parts by mass |
| Triphenyl phosphate (plasticizer) | 7.8 parts by mass |
| Biphenyldiphenyl phosphate (plasticizer) | 3.9 parts by mass |

| Composition of Cellulose Acetate Solution | |
|---|---|
| Methylene chloride (first solvent) | 300 parts by mass |
| Methanol (second solvent) | 54 parts by mass |
| 1-butanol (third solvent) | 11 parts by mass |

In another mixing tank, 16 parts by mass of a retardation increasing agent A below, 9 parts by mass of a retardation increasing agent B, 0.28 parts by mass of silicon dioxide fine particles (average particle size: 0.1 μm), 80 parts by mass of methylene chloride and 20 parts by mass of methanol were put, which were stirred with heating to prepare a retardation increasing agent solution (simultaneously fine particle dispersion liquid). To 474 parts by mass of the cellulose acetate solution, 45 parts by mass of the retardation increasing agent solution was mixed and sufficiently stirred to prepare a dope.

Retardation increasing agent A

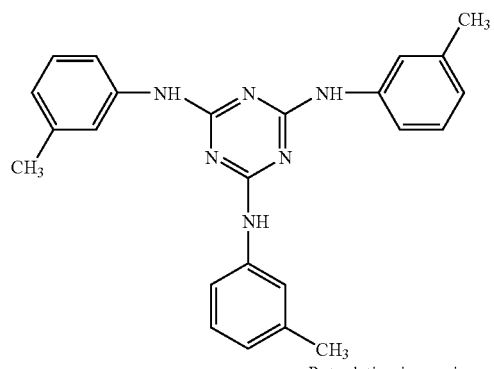

Retardation increasing agent B

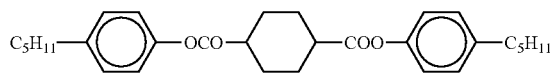

The obtained dope was cast using a band casting machine. A film having a residual solvent amount of 15% by mass was laterally stretched with a tenter at a draw ratio of 20% under a condition of 133° C., which was hold at 50° C. for 30 seconds while maintaining the width after the stretching, and then clips were unfastened to manufacture a cellulose acetate film. A residual solvent amount at the end of the stretching was 5% by mass, which was further dried to make a residual solvent amount be 0.1% by mass or less, thereby manufacturing a film.

The thickness of the film thus obtained (the first retardation film 2) was 80 μm. For the manufactured first retardation film 2, light incident angle dependency of Re was measured with an auto-birefringence index meter (KOBRA-21ADH, manufactured by Oji Scientific Instruments), and it was found that Re was 75 nm and Rth was 249 nm.

<Manufacture of a Polarizing Plate C>

Next, iodine was adsorbed to a stretched polyvinyl alcohol film to manufacture a polarizing film. On both surfaces of the polarizing film, a film obtained by subjecting a commercially available cellulose acetate film (FUJITAC TD80UF, thickness: 80 μm, Re=2 nm, Rth=48 nm, manufactured by Fuji Photo Film Co., Ltd.) to saponification treatment was stuck using a polyvinyl alcohol-based adhesive to manufacture a polarizing plate C.

<Manufacture of a Polarizing Plate D>

In the same way, iodine was adsorbed to a stretched polyvinyl alcohol film to manufacture a polarizing film. On one surface of the polarizing film, a film obtained by subjecting a commercially available cellulose acetate film (FUJITAC TD80UF, thickness: 80 μm, Re=2 nm, Rth=48 nm, manufactured by Fuji Photo Film Co., Ltd.) to saponification treatment was stuck using a polyvinyl alcohol-based adhesive. In the similar way, the first retardation film 2 manufactured above was stuck on the other surface of the polarizing film using a polyvinyl alcohol-based adhesive so that the slow phase axis thereof became parallel to the transmission axis of the polarizing film to form a polarizing plate D. Incidentally, the example employs such constitution that the first retardation film 2 also functions as one of the protective films of the polarizing film.

<Manufacturer of a VA Mode Liquid Crystal Cell 2>

On a glass substrate having one TFT, "JALS-2021-R1" (manufactured by JSR) was applied to form a vertical alignment film. The glass substrate and substrate having the second retardation film formed above were arranged so that respective alignment films faced with each other with a distance between substrates (gap; d) of 3.7 μm. Then, a liquid crystal material having a negative refractive index anisotropy (MLC6608, manufactured by Merck) was poured in drops between substrates and sealed to form a liquid crystal layer between substrates. The retardation of the liquid crystal layer (that is, the product of the thickness d (μm) of the liquid crystal layer and a refractive index anisotropy (Δn); Δn·d) was determined to 310 nm. Thus, a VA mode liquid crystal cell 2 was manufactured.

On the outside of the substrate on the farther side from the second retardation film of the VA mode liquid crystal cell 2 manufactured, the polarizing plate C manufactured above was stuck so that the absorption axis thereof became parallel to the short side direction of the liquid crystal cell. Subsequently, on the other side of the liquid crystal cell, the polarizing plate D manufactured above was stuck in the crossed-Nicols arrangement to manufacture a liquid crystal display device 2. In this constitution, the slow phase axis of the second retardation film 2 is parallel to the absorption axis of the polarizing plate D.

Leak light of the manufactured liquid crystal display device 2 was measured in the way similar to Example 1. The measured leak light was 0.02%. In addition, transmission spectrum at dark level in the same azimuth and transmission spectrum in the panel front direction were measured, and Δu'v' was searched to give 0.051.

Comparative Example 1

A liquid crystal display device was formed in a way similar to Example 1 except that no second retardation film 1 was formed, and leak light and Δu'v' were searched similarly to give 0.04% and 0.152, respectively.

Comparative Example 2

A liquid crystal display device was formed in a way similar to Example 2 except that no second retardation film 2 was formed, and leak light and Δu'v' were searched similarly to give 0.04% and 0.261, respectively.

The invention claimed is:

1. A liquid crystal display device comprising a pair of substrates, at least one polarizing film provided outside the pair of substrates, a liquid crystal cell having at least three color filters of a red color filter, a green color filter and a blue color filter provided inside the pair of substrates, a first retardation film, and a second retardation film, wherein:
  the first retardation film compensates for light of a wavelength or wavelengths corresponding to a color or colors of any one or two of the three color filters,
  the second retardation film is arranged inside the substrate of the pair of substrates and compensates for light of a wavelength that is not compensated for by the first retardation film,
  the liquid crystal display device further comprises a third retardation film,
  a slow phase axis of the first retardation film viewed from the normal direction of film surface is parallel or perpendicular to an absorption axis of the polarizing film,
  a slow phase axis of the second retardation film viewed from the normal direction of film surface is perpendicular to an absorption axis of the polarizing film and a slow phase axis of the third retardation film viewed from the normal direction of film surface is parallel to an absorption axis of the polarizing film, and
  in-plane retardation (Re2) of the second retardation film is ½ or less of in-plane retardation (Re1) of the first retardation film.

2. The liquid crystal display device according to claim 1, wherein the first retardation film is provided between the pair of substrates and the polarizing film.

3. The liquid crystal display device according to claim 1, wherein the second retardation film contains a liquid crystalline compound.

4. The liquid crystal display device according to claim 1, wherein the in-plane retardation (Re2) of the second retardation film is 0 nm-120 nm.

5. The liquid crystal display device according to claim 1, wherein a protective film is provided on the surface of the polarizing film nearer to the liquid crystal cell and retardation Rth in the thickness direction of the protective film is −40 nm to 40 nm.

6. The liquid crystal display device according to claim 1, wherein a protective film is provided on the surface of the polarizing film nearer to the liquid crystal cell and the protective film is composed of a cellulose acylate film or a norbornene-based film.

* * * * *